(12) United States Patent
Osawa et al.

(10) Patent No.: US 9,249,967 B2
(45) Date of Patent: *Feb. 2, 2016

(54) LAMP HAVING OUTER SHELL TO RADIATE HEAT OF LIGHT SOURCE

(71) Applicant: Toshiba Lighting & Technology Corporation, Yokosuka-shi, Kanagawa-ken (JP)

(72) Inventors: Shigeru Osawa, Yokohama (JP); Kazuto Morikawa, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/108,854

(22) Filed: Dec. 17, 2013

(65) Prior Publication Data
US 2014/0104837 A1    Apr. 17, 2014

Related U.S. Application Data

(63) Continuation of application No. 12/794,379, filed on Jun. 4, 2010, which is a continuation of application No. 11/399,492, filed on Apr. 7, 2006, now Pat. No. 7,758,223.

(30) Foreign Application Priority Data

| Apr. 8, 2005 | (JP) | ................................. 2005-112339 |
| Jul. 29, 2005 | (JP) | ................................. 2005-221571 |
| Jul. 29, 2005 | (JP) | ................................. 2005-221688 |
| Dec. 26, 2005 | (JP) | ................................. 2005-371406 |

(51) Int. Cl.
*F21V 29/00* (2015.01)
*F21V 29/507* (2015.01)
(Continued)

(52) U.S. Cl.
CPC ............... *F21V 29/507* (2015.01); *F21K 9/135* (2013.01); *F21K 9/1355* (2013.01);
(Continued)

(58) Field of Classification Search
CPC ..... F21V 29/22; F21V 29/2293; H01L 23/34; H01L 23/36; H01L 23/367; H01L 23/4006; H01L 33/64; H01L 33/642; H01L 33/644; H05K 1/0204; H05K 1/0206; H05K 1/021
USPC ................................................... 362/363, 373
See application file for complete search history.

(56) References Cited

U.S. PATENT DOCUMENTS

| 1,972,790 A | 9/1934 | Olley |
| 2,907,868 A | 10/1959 | Henschel |

(Continued)

FOREIGN PATENT DOCUMENTS

| CN | 101307887 A | 11/2008 |
| CN | 100559073 C | 11/2009 |

(Continued)

OTHER PUBLICATIONS

Chinese Office Action issued in CN 201010216943 on Oct. 26, 2011.

(Continued)

*Primary Examiner* — Mary McManmon
(74) *Attorney, Agent, or Firm* — Banner & Witcoff, Ltd.

(57) ABSTRACT

A lamp includes an outer shell having heat conductivity, a base provided in the outer shell, and a cover provided in the outer shell. The outer shell has a light source support, and a heat radiating surface exposed to the outside of the outer shell. The light source support is formed integral with the heat radiating surface. A light source is supported on the light source support. The light source is heated during lighting, and thermally connected to the light source support. The light source is covered with the cover.

7 Claims, 22 Drawing Sheets

(51) Int. Cl.
*F21K 99/00* (2010.01)
*F21V 3/00* (2015.01)
*H05B 33/08* (2006.01)
*F21V 17/10* (2006.01)
*F21V 29/70* (2015.01)
*F21V 15/01* (2006.01)
*F21V 9/08* (2006.01)
*F21V 29/71* (2015.01)
*F21Y 101/02* (2006.01)
*F21V 23/00* (2015.01)
*F21V 29/77* (2015.01)
*F21V 29/83* (2015.01)

(52) U.S. Cl.
CPC ............... *F21K 9/1375* (2013.01); *F21V 3/00* (2013.01); *F21V 9/08* (2013.01); *F21V 15/011* (2013.01); *F21V 17/101* (2013.01); *F21V 29/004* (2013.01); *F21V 29/20* (2013.01); *F21V 29/22* (2013.01); *F21V 29/70* (2015.01); *F21V 29/713* (2015.01); *H05B 33/0803* (2013.01); *F21V 23/002* (2013.01); *F21V 23/006* (2013.01); *F21V 29/2231* (2013.01); *F21V 29/2293* (2013.01); *F21V 29/773* (2015.01); *F21V 29/83* (2015.01); *F21Y 2101/02* (2013.01); *Y02B 20/383* (2013.01)

(56) References Cited

U.S. PATENT DOCUMENTS

| | | |
|---|---|---|
| 3,775,634 A | 11/1973 | Hasell et al. |
| 3,932,780 A | 1/1976 | DeCaro et al. |
| 3,975,072 A | 8/1976 | Ammon |
| 4,169,238 A | 9/1979 | English et al. |
| 4,211,955 A | 7/1980 | Ray |
| 4,254,453 A | 3/1981 | Mouyard et al. |
| 4,270,071 A | 5/1981 | Morton |
| 4,315,186 A | 2/1982 | Hirano et al. |
| 4,337,414 A | 6/1982 | Young |
| 4,355,853 A | 10/1982 | Kourimsky |
| 4,366,416 A | 12/1982 | Yokoyama |
| 4,375,607 A | 3/1983 | Morton et al. |
| 4,449,071 A | 5/1984 | Yokoyama |
| 4,503,358 A | 3/1985 | Kamei et al. |
| 4,503,360 A | 3/1985 | Bedel |
| 4,630,182 A | 12/1986 | Moroi et al. |
| 4,656,386 A | 4/1987 | Bloom et al. |
| 4,728,849 A | 3/1988 | Morris et al. |
| 4,748,380 A | 5/1988 | MacDonald et al. |
| 4,821,051 A * | 4/1989 | Hediger .................. B41J 2/45 347/130 |
| 4,829,412 A | 5/1989 | Pavelin |
| 4,858,089 A | 8/1989 | Pietro |
| 4,879,638 A | 11/1989 | Pavelin |
| 4,939,420 A | 7/1990 | Lim |
| 4,947,078 A | 8/1990 | Rice et al. |
| 4,965,457 A | 10/1990 | Wrobel et al. |
| 5,015,917 A | 5/1991 | Nigg |
| 5,281,889 A | 1/1994 | Fields et al. |
| 5,289,079 A | 2/1994 | Wittmann |
| 5,323,271 A | 6/1994 | Shimada |
| 5,327,332 A | 7/1994 | Hafemeister |
| D356,107 S | 3/1995 | Watanabe et al. |
| 5,408,389 A | 4/1995 | Burlingame |
| 5,461,284 A | 10/1995 | Roberts et al. |
| 5,537,301 A | 7/1996 | Martich |
| 5,556,584 A | 9/1996 | Yamazaki et al. |
| 5,585,697 A | 12/1996 | Cote et al. |
| 5,595,438 A | 1/1997 | Burd |
| 5,607,228 A | 3/1997 | Ozaki et al. |
| 5,621,266 A | 4/1997 | Popov et al. |
| 5,632,551 A | 5/1997 | Roney et al. |
| 5,685,628 A | 11/1997 | Feger et al. |
| 5,747,919 A | 5/1998 | Gandhi et al. |
| 5,775,792 A | 7/1998 | Wiese |
| 5,785,418 A | 7/1998 | Hochstein |
| 5,789,847 A | 8/1998 | Woodward et al. |
| 5,806,965 A | 9/1998 | Deese |
| 5,808,414 A | 9/1998 | Wharmby et al. |
| 5,828,170 A | 10/1998 | Nishio et al. |
| 5,839,822 A | 11/1998 | Oechsle |
| 5,844,357 A | 12/1998 | Iida et al. |
| 5,857,767 A | 1/1999 | Hochstein |
| 5,921,660 A | 7/1999 | Yu |
| 5,947,588 A | 9/1999 | Huang |
| 6,036,336 A | 3/2000 | Wu |
| 6,095,668 A | 8/2000 | Rykowski et al. |
| 6,153,972 A | 11/2000 | Katougi et al. |
| 6,161,910 A * | 12/2000 | Reisenauer et al. .......... 315/309 |
| 6,186,646 B1 | 2/2001 | Wiedemer |
| 6,227,679 B1 | 5/2001 | Zhang et al. |
| 6,234,649 B1 | 5/2001 | Katougi |
| 6,268,685 B1 | 7/2001 | Stark et al. |
| 6,294,973 B1 | 9/2001 | Kimura et al. |
| 6,502,968 B1 | 1/2003 | Simon |
| 6,511,209 B1 | 1/2003 | Chiang |
| 6,515,433 B1 | 2/2003 | Ge et al. |
| 6,517,217 B1 | 2/2003 | Liao |
| 6,540,376 B2 | 4/2003 | Victor |
| 6,552,658 B1 | 4/2003 | Roller et al. |
| 6,598,996 B1 | 7/2003 | Lodhie |
| 6,607,290 B2 | 8/2003 | Matsuba et al. |
| 6,621,716 B2 | 9/2003 | Edwards et al. |
| 6,641,283 B1 | 11/2003 | Bohler |
| 6,642,671 B2 | 11/2003 | Kurachi et al. |
| 6,688,753 B2 | 2/2004 | Calon et al. |
| 6,786,625 B2 | 9/2004 | Wesson |
| 6,787,999 B2 | 9/2004 | Stimac et al. |
| D497,439 S | 10/2004 | Shaw et al. |
| 6,814,470 B2 | 11/2004 | Rizkin et al. |
| 6,919,671 B2 | 7/2005 | Bachetzky et al. |
| 6,919,967 B1 | 7/2005 | Pentecost et al. |
| 6,936,855 B1 | 8/2005 | Harrah |
| 6,948,829 B2 | 9/2005 | Verdes et al. |
| 6,982,518 B2 | 1/2006 | Chou et al. |
| 7,012,376 B2 | 3/2006 | Yamashita et al. |
| 7,040,779 B2 | 5/2006 | Lamke et al. |
| 7,059,748 B2 | 6/2006 | Coushaine et al. |
| 7,074,104 B2 | 7/2006 | Itaya et al. |
| 7,111,961 B2 | 9/2006 | Trenchard et al. |
| 7,125,146 B2 | 10/2006 | Willis et al. |
| 7,128,454 B2 | 10/2006 | Kim et al. |
| 7,144,140 B2 | 12/2006 | Sun et al. |
| D534,665 S | 1/2007 | Egawa et al. |
| D535,038 S | 1/2007 | Egawa et al. |
| 7,161,311 B2 | 1/2007 | Mueller et al. |
| 7,165,866 B2 | 1/2007 | Li |
| 7,198,387 B1 | 4/2007 | Gloisten et al. |
| 7,220,024 B1 | 5/2007 | Berends |
| 7,226,189 B2 | 6/2007 | Lee et al. |
| 7,258,475 B2 | 8/2007 | Kurumatani |
| 7,281,818 B2 | 10/2007 | You et al. |
| 7,300,173 B2 | 11/2007 | Catalano et al. |
| 7,310,216 B2 | 12/2007 | Stevenson et al. |
| 7,327,254 B2 | 2/2008 | Chen |
| 7,329,024 B2 | 2/2008 | Lynch et al. |
| 7,331,689 B2 | 2/2008 | Chen |
| 7,347,589 B2 | 3/2008 | Ge |
| 7,431,477 B2 | 10/2008 | Chou et al. |
| 7,492,079 B2 | 2/2009 | Ballenger et al. |
| 7,497,596 B2 | 3/2009 | Ge |
| 7,566,154 B2 * | 7/2009 | Gloisten et al. ................ 362/545 |
| 7,631,987 B2 | 12/2009 | Wei |
| 7,679,096 B1 | 3/2010 | Ruffin |
| 7,758,223 B2 | 7/2010 | Osawa et al. |
| 7,806,575 B2 | 10/2010 | Willwohl et al. |
| 7,911,118 B2 | 3/2011 | Rooymans |
| 7,919,339 B2 | 4/2011 | Hsu |
| 7,947,596 B2 | 5/2011 | Takeda et al. |
| 8,058,784 B2 | 11/2011 | Treurniet et al. |
| 2002/0021070 A1 | 2/2002 | Sakai et al. |
| 2002/0024814 A1 | 2/2002 | Matsuba et al. |

(56) References Cited

U.S. PATENT DOCUMENTS

| | | |
|---|---|---|
| 2002/0036908 A1 | 3/2002 | Pederson |
| 2002/0097586 A1 | 7/2002 | Horowitz |
| 2002/0118538 A1 | 8/2002 | Calon et al. |
| 2002/0195918 A1 | 12/2002 | Matsuba et al. |
| 2003/0063476 A1 | 4/2003 | English et al. |
| 2003/0117797 A1 | 6/2003 | Sommers et al. |
| 2003/0117801 A1 | 6/2003 | Lin et al. |
| 2003/0137838 A1 | 7/2003 | Rizkin et al. |
| 2003/0151917 A1 | 8/2003 | Daughtry et al. |
| 2003/0185020 A1 | 10/2003 | Stekelenburg |
| 2004/0012955 A1 | 1/2004 | Hsieh |
| 2004/0042224 A1 | 3/2004 | Chen |
| 2004/0109310 A1 | 6/2004 | Galli |
| 2004/0120156 A1 | 6/2004 | Ryan |
| 2004/0145898 A1 | 7/2004 | Ase et al. |
| 2004/0156191 A1 | 8/2004 | Biasoli et al. |
| 2004/0184272 A1 | 9/2004 | Wright et al. |
| 2004/0218385 A1 | 11/2004 | Tomiyoshi et al. |
| 2004/0232815 A1 | 11/2004 | Tomiyoshi et al. |
| 2004/0264195 A1* | 12/2004 | Chang et al. .......... 362/294 |
| 2005/0007772 A1 | 1/2005 | Yen |
| 2005/0024864 A1 | 2/2005 | Galli |
| 2005/0068776 A1 | 3/2005 | Ge |
| 2005/0073244 A1 | 4/2005 | Chou et al. |
| 2005/0111234 A1 | 5/2005 | Martin et al. |
| 2005/0162864 A1 | 7/2005 | Verdes et al. |
| 2005/0174769 A1 | 8/2005 | Yong et al. |
| 2005/0174780 A1 | 8/2005 | Park |
| 2005/0180142 A1* | 8/2005 | Tsai .......... 362/294 |
| 2005/0212396 A1 | 9/2005 | Oetken et al. |
| 2005/0212437 A1 | 9/2005 | Ballenger et al. |
| 2005/0243552 A1 | 11/2005 | Maxik |
| 2005/0254246 A1 | 11/2005 | Huang |
| 2006/0007690 A1 | 1/2006 | Cheng |
| 2006/0012999 A1 | 1/2006 | Coushaine et al. |
| 2006/0028830 A1 | 2/2006 | Tsai |
| 2006/0034077 A1 | 2/2006 | Chang |
| 2006/0043546 A1 | 3/2006 | Kraus |
| 2006/0050514 A1 | 3/2006 | Opolka |
| 2006/0092640 A1 | 5/2006 | Li |
| 2006/0098441 A1* | 5/2006 | Chou .......... 362/294 |
| 2006/0176699 A1 | 8/2006 | Crunk |
| 2006/0181416 A1 | 8/2006 | Chen |
| 2006/0193130 A1 | 8/2006 | Ishibashi |
| 2006/0193139 A1 | 8/2006 | Sun et al. |
| 2006/0198147 A1 | 9/2006 | Ge |
| 2006/0215408 A1 | 9/2006 | Lee |
| 2006/0227558 A1 | 10/2006 | Osawa et al. |
| 2006/0239002 A1 | 10/2006 | Chou et al. |
| 2007/0002570 A1 | 1/2007 | Souza et al. |
| 2007/0041182 A1 | 2/2007 | Ge et al. |
| 2007/0096114 A1 | 5/2007 | Aoki et al. |
| 2007/0103904 A1 | 5/2007 | Chen |
| 2007/0121328 A1 | 5/2007 | Mondloch et al. |
| 2007/0247840 A1 | 10/2007 | Ham |
| 2007/0279903 A1 | 12/2007 | Negley et al. |
| 2008/0037255 A1 | 2/2008 | Wang |
| 2008/0084701 A1 | 4/2008 | Van De Ven et al. |
| 2008/0112170 A1 | 5/2008 | Trott et al. |
| 2008/0130272 A1 | 6/2008 | Waters |
| 2008/0130298 A1 | 6/2008 | Negley et al. |
| 2008/0224608 A1 | 9/2008 | Konishi et al. |
| 2009/0059595 A1 | 3/2009 | Ge |
| 2009/0116229 A1 | 5/2009 | Dalton et al. |
| 2009/0116231 A1 | 5/2009 | Miller |
| 2009/0161356 A1 | 6/2009 | Negley et al. |
| 2009/0184646 A1 | 7/2009 | Devaney et al. |
| 2009/0207602 A1 | 8/2009 | Reed et al. |
| 2009/0294780 A1 | 12/2009 | Chou et al. |
| 2010/0026157 A1 | 2/2010 | Tanaka et al. |
| 2010/0096992 A1 | 4/2010 | Yamamoto et al. |
| 2010/0207534 A1 | 8/2010 | Dowling et al. |
| 2010/0219735 A1 | 9/2010 | Sakai et al. |
| 2010/0225220 A1 | 9/2010 | Tanaka et al. |
| 2010/0237746 A1 | 9/2010 | Calisti et al. |
| 2010/0237761 A1 | 9/2010 | Osawa et al. |
| 2010/0237779 A1 | 9/2010 | Osawa et al. |
| 2010/0244650 A1 | 9/2010 | Osawa et al. |
| 2010/0244694 A1 | 9/2010 | Osawa et al. |
| 2010/0253200 A1 | 10/2010 | Osawa et al. |
| 2010/0277082 A1 | 11/2010 | Reed et al. |
| 2010/0287652 A1 | 11/2010 | Popi |
| 2010/0289396 A1 | 11/2010 | Osawa et al. |
| 2010/0313983 A1 | 12/2010 | Aoki et al. |
| 2010/0327746 A1 | 12/2010 | Hisayasu |
| 2010/0327751 A1 | 12/2010 | Takenaka et al. |
| 2011/0025206 A1 | 2/2011 | Hiramatsu et al. |
| 2011/0063842 A1 | 3/2011 | Takei et al. |
| 2011/0068674 A1 | 3/2011 | Takenaka et al. |
| 2011/0074269 A1 | 3/2011 | Hisayasu et al. |
| 2011/0074271 A1 | 3/2011 | Takeshi et al. |
| 2011/0074290 A1 | 3/2011 | Sakai et al. |
| 2011/0074291 A1 | 3/2011 | Osawa et al. |
| 2011/0084956 A1 | 4/2011 | Choi et al. |
| 2011/0089806 A1 | 4/2011 | Suwa et al. |
| 2011/0156569 A1 | 6/2011 | Osawa |
| 2011/0210664 A1 | 9/2011 | Hisayasu et al. |
| 2011/0299695 A1 | 12/2011 | Nicholson |
| 2011/0309386 A1 | 12/2011 | Osawa et al. |
| 2011/0310606 A1 | 12/2011 | Osawa et al. |
| 2012/0001215 A1 | 1/2012 | Sanpei et al. |

FOREIGN PATENT DOCUMENTS

| | | |
|---|---|---|
| DE | 10 2004 042186 A1 | 3/2006 |
| DE | 20 2008 016231 U1 | 3/2009 |
| EP | 1 705 421 A2 | 9/2006 |
| EP | 2 037 633 A1 | 3/2009 |
| EP | 2 149 742 A2 | 2/2010 |
| JP | 57-152706 A | 9/1982 |
| JP | 59-035303 A | 2/1984 |
| JP | 61-035216 A | 2/1986 |
| JP | 62-190366 U | 12/1987 |
| JP | 63-005581 | 1/1988 |
| JP | 63-102265 A | 5/1988 |
| JP | 63-102266 | 5/1988 |
| JP | 64-007402 | 1/1989 |
| JP | 01-206505 A | 8/1989 |
| JP | 02-091105 | 3/1990 |
| JP | 2000-083343 A | 3/2000 |
| JP | 2000-173303 A | 6/2000 |
| JP | 2001-243809 A | 9/2001 |
| JP | 2002-525814 A | 8/2002 |
| JP | 2002-280617 A | 9/2002 |
| JP | 2003-016808 A | 1/2003 |
| JP | 2003-051209 A | 2/2003 |
| JP | 2003-059305 A | 2/2003 |
| JP | 2003-059330 A | 2/2003 |
| JP | 2003-092022 A | 3/2003 |
| JP | 2004-119078 A | 4/2004 |
| JP | 2004-193053 A | 7/2004 |
| JP | 2004-006096 | 8/2004 |
| JP | 2004-221042 A | 8/2004 |
| JP | 2005-093097 | 4/2005 |
| JP | 2005-123200 A | 5/2005 |
| JP | 2005-513815 A | 5/2005 |
| JP | 2005-166578 A | 6/2005 |
| JP | 2005-221571 A | 8/2005 |
| JP | 2005-221688 A | 8/2005 |
| JP | 2005-269017 A | 9/2005 |
| JP | 2005-286267 A | 10/2005 |
| JP | 2006-040727 A | 2/2006 |
| JP | 31-021916 | 5/2006 |
| JP | 2006-156187 A | 6/2006 |
| JP | 2006-244725 A | 9/2006 |
| JP | 2006-310057 A | 11/2006 |
| JP | 2006-313717 A | 11/2006 |
| JP | 2006-313718 A | 11/2006 |
| JP | 2006-313731 A | 11/2006 |
| JP | 2007-073306 | 3/2007 |
| JP | 2007-188832 A | 7/2007 |
| JP | 2007-207576 A | 8/2007 |
| JP | 2008-027910 A | 2/2008 |
| JP | 2008-091140 | 4/2008 |

(56) References Cited

FOREIGN PATENT DOCUMENTS

| JP | 2008-198625 A | 8/2008 |
|---|---|---|
| JP | 2008-227412 A | 9/2008 |
| JP | 2008-277561 A | 11/2008 |
| JP | 2009-037995 | 2/2009 |
| JP | 2009-117342 A | 5/2009 |
| JP | 2009-135026 A | 6/2009 |
| JP | 2009-206104 A | 9/2009 |
| WO | 03/056636 A1 | 7/2003 |
| WO | 2005/024898 A2 | 3/2005 |
| WO | 2008/146694 A1 | 12/2008 |
| WO | 2009/087897 A1 | 7/2009 |

OTHER PUBLICATIONS

Office Action issed in corresponding Japanese Appl 2005-221571 on Jul. 7, 2009.
Office Action issued in corresponding Japanese Appl 2005-221571 on Oct. 20, 2009.
Office Action issued in corresponding Japanese Appl 2005-221571 on Aug. 25, 2009.
Office Action issued in Japanese Appl 2005-221688 on Jan. 26, 2010.
Japanese Office Action issued in 2005-269017 on Jan. 13, 2011.
European Search Report issued in EP 10178361.1 on Jul. 4, 2011.
Japanese Office Action issued in JP 2008-198625 on May 26, 2010.
Amendment filed in JP 2008-198625 on Jun. 28, 2010.
Extended European Search Report issued in EP Appl 10006720.6 on Oct. 13, 2010.
IPRP & WO issued in PCT/JP2008/073436 on Aug. 10, 2010.
Office Action issued in U.S. Appl. No. 11/399,492, mailed Jun. 24, 2009.
Notice of Allowance issued in U.S. Appl. No. 11/399,492 on Mar. 9, 2010.
U.S. Appl. No. 13/221,519.
U.S. Appl. No. 13/221,551.
U.S. Appl. No. 12/794,476.
U.S. Appl. No. 12/794,558.
U.S. Appl. No. 13/044,369.
U.S. Appl. No. 12/888,921.
U.S. Appl. No. 13/034,959.
U.S. Appl. No. 13/172,557.
U.S. Appl. No. 12/933,969.
U.S. Appl. No. 12/885,005.
U.S. Appl. No. 12/825,650.
U.S. Appl. No. 12/794,379.
U.S. Appl. No. 12/794,429.
U.S. Appl. No. 12/794,509.
U.S. Appl. No. 12/811,795.
U.S. Appl. No. 12/738,081.
U.S. Appl. No. 12/713,230.
U.S. Appl. No. 12/825,956.
U.S. Appl. No. 12/880,490.
U.S. Appl. No. 12/845,330.
U.S. Appl. No. 12/885,849.
U.S. Appl. No. 12/886,025.
U.S. Appl. No. 12/886,123.
U.S. Appl. No. 11/399,492.
International Preliminary Report on Patentability and Written Opinion issued in PCT/JP2008/068625 mailed May 11, 2010.
Office Action issued in Japanese Appl 2005-371406 on Apr. 20, 2010.
Extended European Search Report issued in EP 111560003.9 on May 18, 2011.
Extended European Search Report issued in EP 08838942.4 on Jun. 1, 2011.
Search Report of International Application No. PCT/JP2008/068625 Mailed Dec. 9, 2008.
English Language Translation of International Search Report for PCT/JP2008/073436 mailed Dec. 9, 2008.
Chinese Office Action issued in CN2009-10176110.2 dated Jul. 11, 2012.
Office Action for corresponding U.S. Appl. No. 12/794,429 mailed Aug. 7, 2012.
International Search Report for PCT/JP2008/073436 mailed Mar. 24, 2009.
Non Final Office Action issued in U.S. Appl. No. 12/794,509 dated Mar. 7, 2011.
Non Final Office Action issued in U.S. Appl. No. 12/794,509 dated Dec. 29, 2011.
Non Final Office issued in U.S. Appl. No. 12/794,509 dated Oct. 4, 2012.
Final Office Action issued in U.S. Appl. No. 12/794,509 dated Jun. 4, 2012.
Non Final Office Action issued in U.S. Appl. No. 13/044,369 dated Feb. 27, 2012.
Non Final Office Action issued in U.S. Appl. No. 12/794,476 dated Feb. 24, 2011.
Non Final Office Action issued in U.S. Appl. No. 12/794,476 dated Oct. 18, 2011.
Final Office Action issued in U.S. Appl. No. 12/794,476 dated Apr. 30, 2012.
Non Final Office Action issued in U.S. Appl. No. 13/221,551 dated Mar. 29, 2012.
Final Office Action issued in U.S. Appl. No. 13/221,551 dated Oct. 15, 2012.
Non Final Office Action issued in U.S. Appl. No. 13/221,519 dated Feb. 27, 2012.
Final Office Action issued in U.S. Appl. No. 13/221,519 dated Aug. 14, 2012.
Non Final Office Action issued in U.S. Appl. No. 12/794,429 dated Feb. 17, 2011.
Non Final Office Action issued in U.S. Appl. No. 12/794,429 dated Feb. 29, 2012.
Final Office Action issued in U.S. Appl. No. 12/794,429 dated Nov. 15, 2011.
Non Final Office Action issued in U.S. Appl. No. 12/794,379 dated Feb. 25, 2011.
Non Final Office Action issued in U.S. Appl. No. 12/794,379 dated Mar. 28, 2012.
Final Office Action issued in U.S. Appl. No. 13/794,379 dated Nov. 8, 2011.
Notice of Allowance issued in U.S. Appl. No. 12/794,379 dated Aug. 15, 2012.
Notice of Allowance issued in U.S. Appl. No. 13/794,379 dated Sep. 26, 2012.
Non Final Office Action issued in U.S. Appl. No. 12/794,476 dated Sep. 21, 2012.
Office Action received in corresponding CN Application No. 200910176111.7 mailed on Nov. 16, 2012.
Notice of Allowance received in corresponding U.S. Appl. No. 13/044,369 mailed Nov. 8, 2012.
Final Office Action received in U.S. Appl. No. 12/794,476 mailed Apr. 2, 2013.
Non-final Office Action received in U.S. Appl. No. 13/566,612 mailed May 1, 2013.
Non Final Office Acton issued in U.S. Appl. No. 12/794,509 mailed Jun. 10, 2013.
Non-Final Office Action issued in U.S. Appl. No. 13/221,551 mailed Jul. 31, 2013.
Non-final Office Action received in U.S. Appl. No. 12/794,429 mailed Aug. 13, 2013.
Notice of Allowance issued in corresponding U.S. Appl. No. 12/794,379 mailed Aug. 30, 2013.
Non Final Office Action issued in U.S. Appl. No. 13/566,526, mailed Sep. 13, 2013.
Final Office Action issued in U.S. Appl. No. 13/566,612, mailed Sep. 12, 2013.
Non Final Office Action issued in U.S. Appl. No. 13/566,453, mailed Sep. 18, 2013.
Non Final Office Action issued in U.S. Appl. No. 12/794,476 mailed Sep. 10, 2013.
Non Final Office Action issued in U.S. Appl. No. 13/221,519 issued Jul. 11, 2013.

(56) References Cited

OTHER PUBLICATIONS

Office Action received in U.S. Appl. No. 12/794,509 mailed Oct. 16, 2013.
Non Final Office Action issued in U.S. Appl. No. 13/763,025, issued Nov. 8, 2013.
Non-Final Office Action issued in corresponding U.S. Appl. No. 12/794,429 mailed Dec. 31, 2013.
Final Office Action issued in U.S. Appl. No. 12/794,476 mailed Jan. 30, 2014.
Final Office Action received in corresponding U.S. Appl. No. 13/221,551 mailed Feb. 7, 2014.
Non-final Office Action issued in U.S. Appl. No. 13/566,612 mailed Feb. 11, 2014.
Non-final Office Action issued in U.S. Appl. No. 12/794,379 mailed Feb. 19, 2014.
Final Office Action received in corresponding U.S. Appl. No. 13/566,453 dated Mar. 12, 2014.
Non-Final Office Action received in corresponding U.S. Appl. No. 13/221,519 mailed Mar. 21, 2014.
Final Office Action received in corresponding U.S. Appl. No. 13/763,025 mailed Mar. 28, 2014.
Final Office Action received in corresponding U.S. Appl. No. 13/566,572 mailed Mar. 31, 2014.
Notice of Panel Decision from Pre-Appeal Brief Review in corresponding U.S. Appl. No. 13/794,509 mailed Apr. 17, 2014.
Jul. 31, 2014—(US) Notice of Allowance—U.S. Appl. No. 13/221,519.
Oct. 7, 2014—(US) Notice of Allowance—U.S. Appl. No. 13/763,025.
Non-Final Office Action received in corresponding U.S. Appl. No. 13/763,025 mailed May 5, 2014.
Final Office Action received in corresponding U.S. Appl. No. 12/794,429 mailed May 9, 2014.
Non-Final Office Action received in corresponding U.S. Appl. No. 13/221,551 mailed May 28, 2014.
Non Final Office Action issued in corresponding U.S. Appl. No. 12/794,379 mailed May 12, 2014.
Non-Final Office Action received in corresponding U.S. Appl. No. 12/794,476 mailed Jun. 6, 2014.
Final Office Action received in corresponding U.S. Appl. No. 13/566,612 mailed Jun. 6, 2014.
Non-Final Office Action received in corresponding U.S. Appl. No. 12/794,509 mailed Jun. 11, 2014.
Non-Final Office Action received in corresponding U.S. Appl. No. 14/086,113 mailed Jun. 18, 2014.
Non-Final Office Action received in corresponding U.S. Appl. No. 14/086,143 mailed Jun. 18, 2014.
Non-Final Office Action received in corresponding U.S. Appl. No. 14/086,167 mailed Jul. 7, 2014.
Non-Final Office Action received in corresponding U.S. Appl. No. 13/566,453 mailed Jul. 3, 2014.
Notice of Allowance received in corresponding U.S. Appl. No. 13/566,572 mailed Jul. 14, 2014.
Jan. 2, 2015—(US) Final Office Action—U.S. Appl. No. 14/086,113.
Jan. 5, 2015—(US) Final Office Action—U.S. Appl. No. 14/086,143.
Jan. 7, 2015—(US) Final Office Action—U.S. Appl. No. 12/794,476.
Jan. 23, 2015—(US) Notice of Allowance—U.S. Appl. No 14/086,167.
Mar. 10, 2015—(US) Notice of Allowance—U.S. Appl. No. 12/794,509.
Mar. 11, 2015—(US) Final Office Action—U.S. Appl. No. 13/566,526.
Sep. 3, 2015—(US) Notice of Allowance—U.S. Appl. No. 13/566,453.
Apr. 30, 2015—(US) Non-Final Office Action—U.S. Appl. No. 13/566,453.
Nov. 13, 2014—(US) Final Office Action—U.S. Appl. No. 12/794,379.
Nov. 20, 2014—(US) Final Office Action—U.S. Appl. No. 13/221,551.
Oct. 30, 2014—(US) Notice of Allowance—U.S. Appl. No. 13/566,572.
Dec. 24, 2014—(US) Final Office Action—U.S. Appl. No. 13/566,453.
Final Office Action issued in U.S. Appl. No. 13/221,519 mailed Dec. 5, 2013.
Non-Final Office Action received in corresponding U.S. Appl. No. 13/566,572 mailed Dec. 9, 2013.

\* cited by examiner

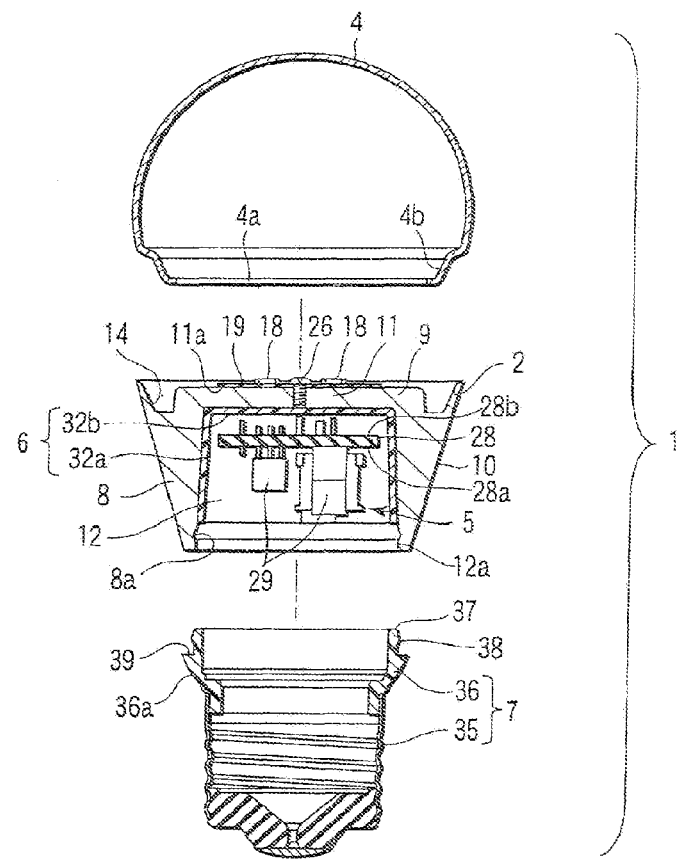
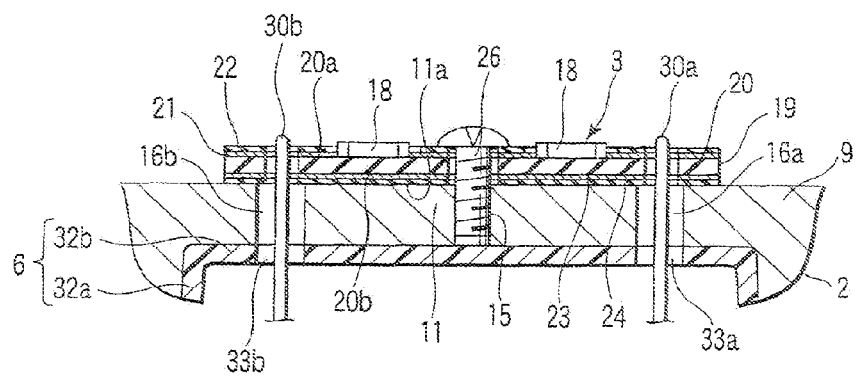
FIG. 3
FIG. 4

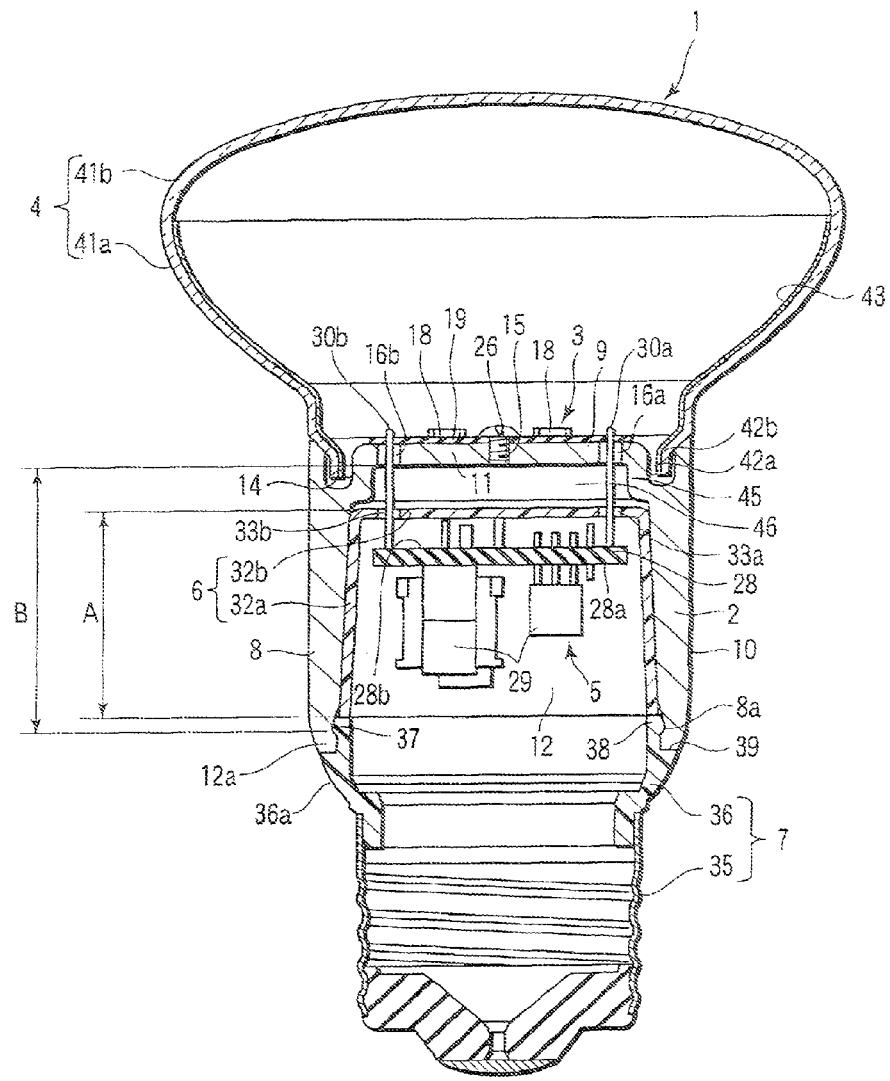
F I G. 7

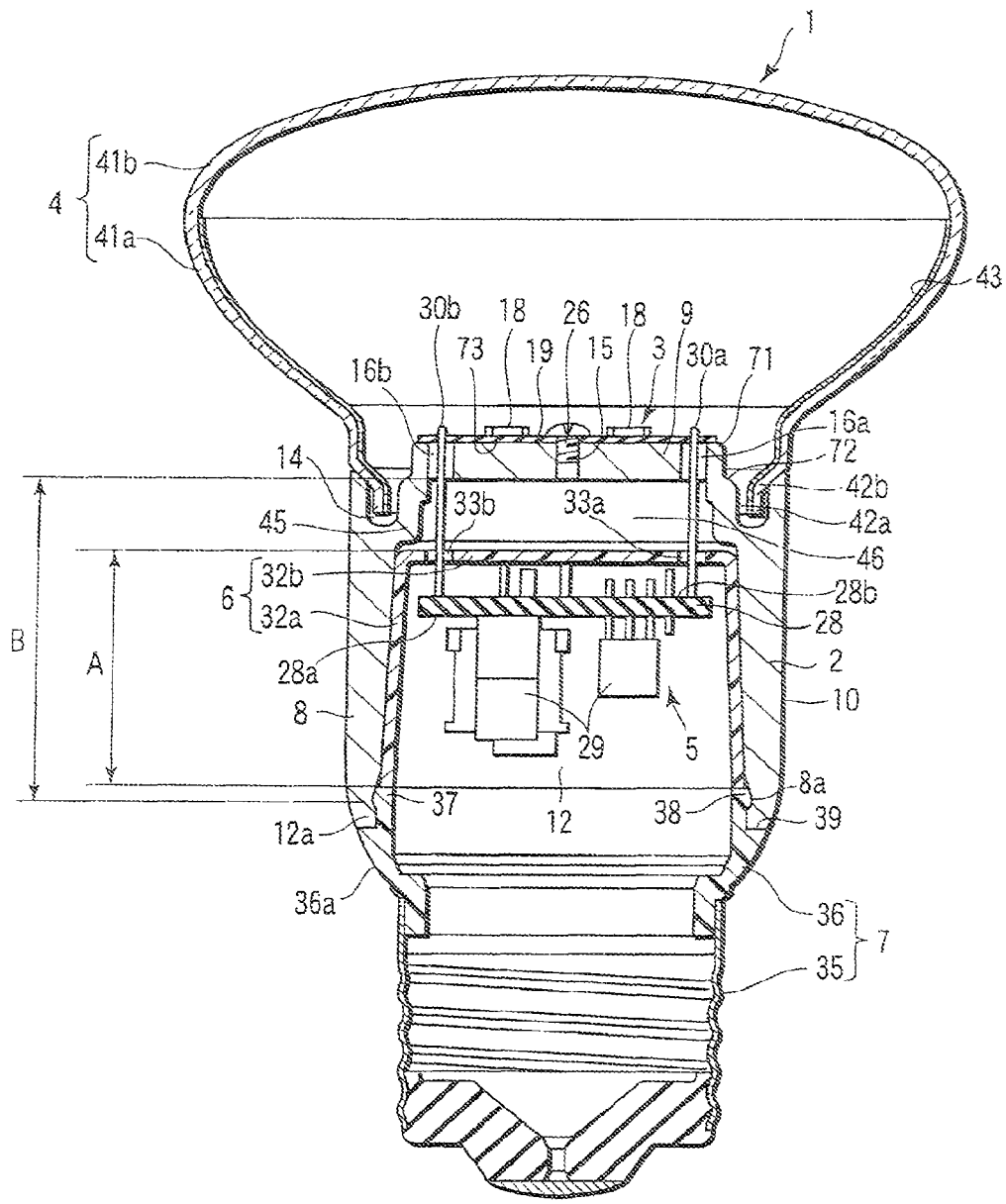
F I G. 12

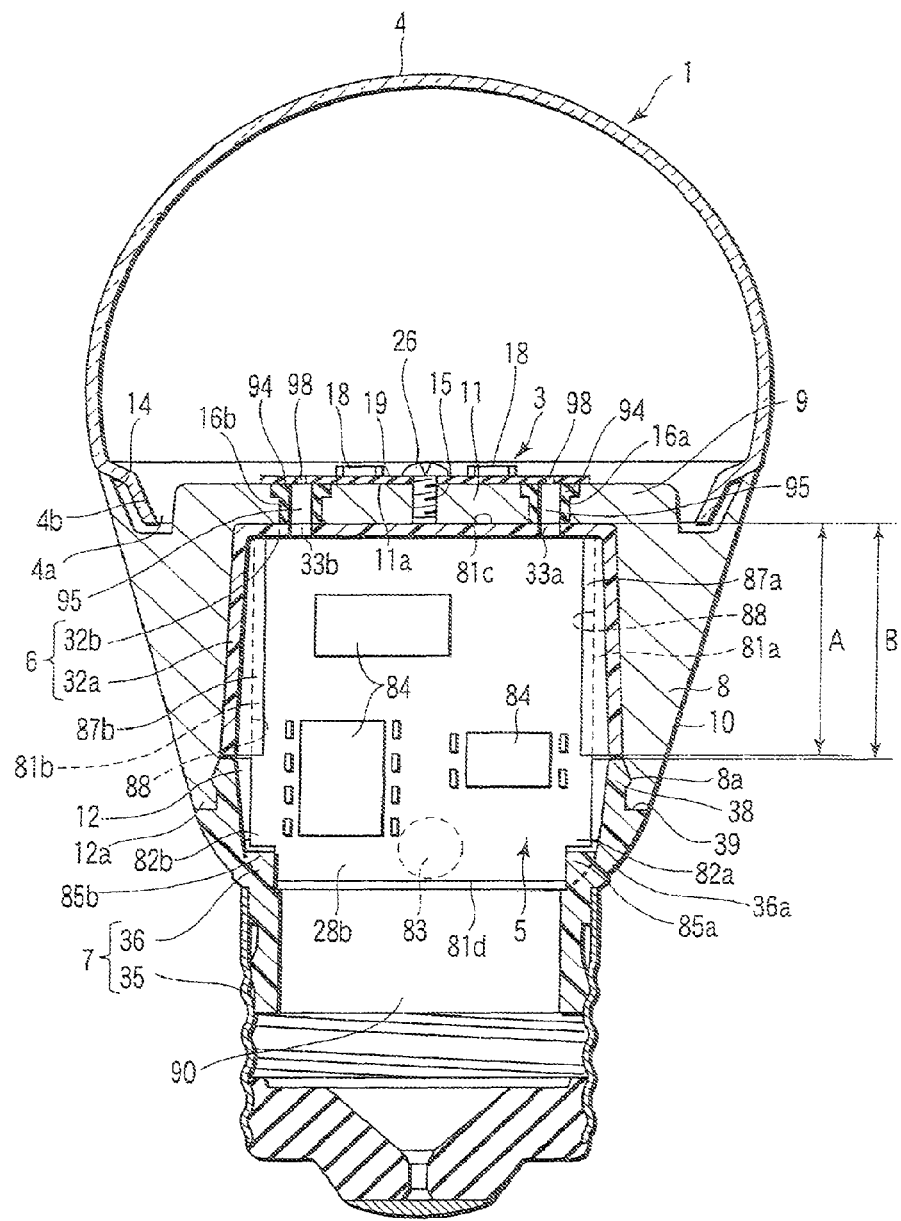
F I G. 14

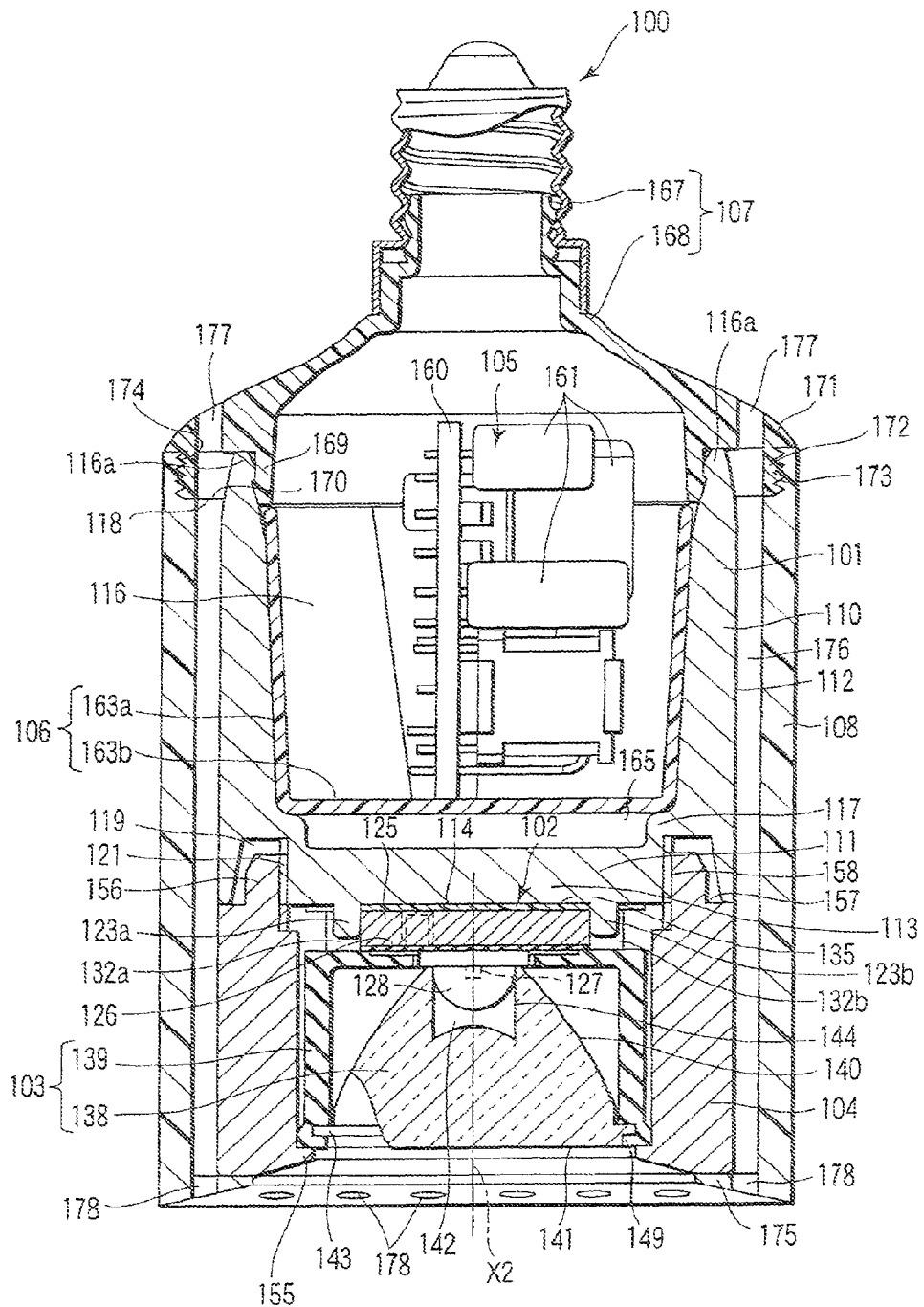
F I G. 21

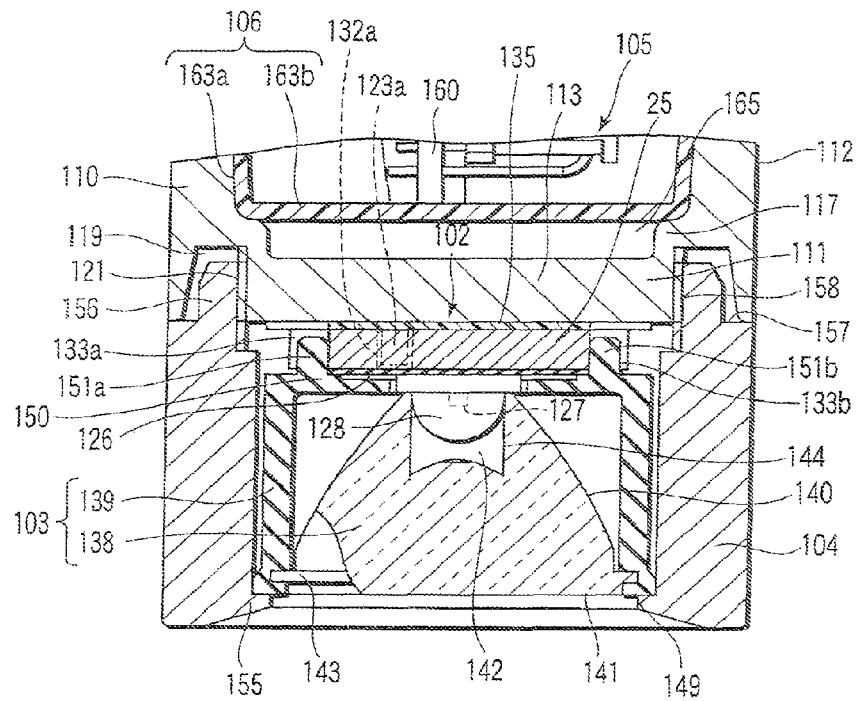
F I G. 22
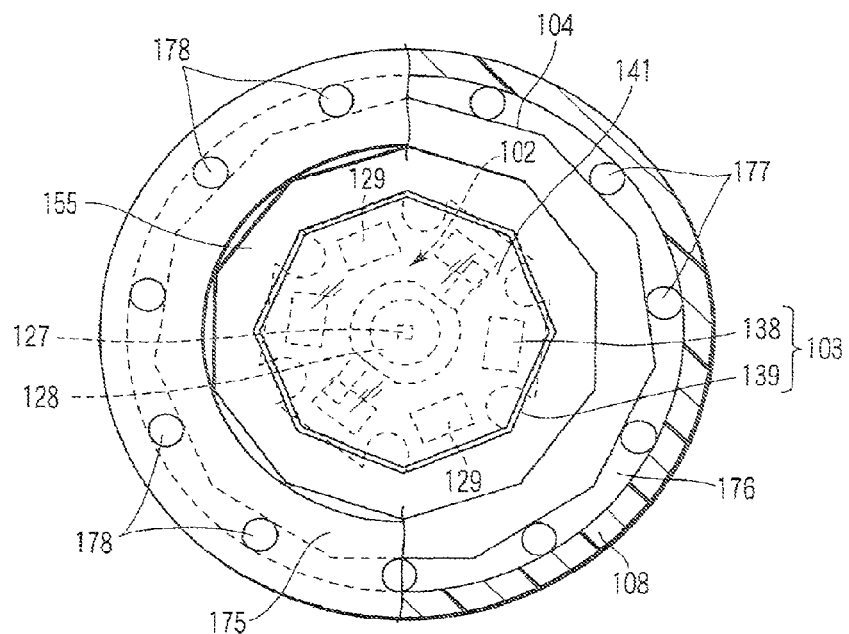
F I G. 23

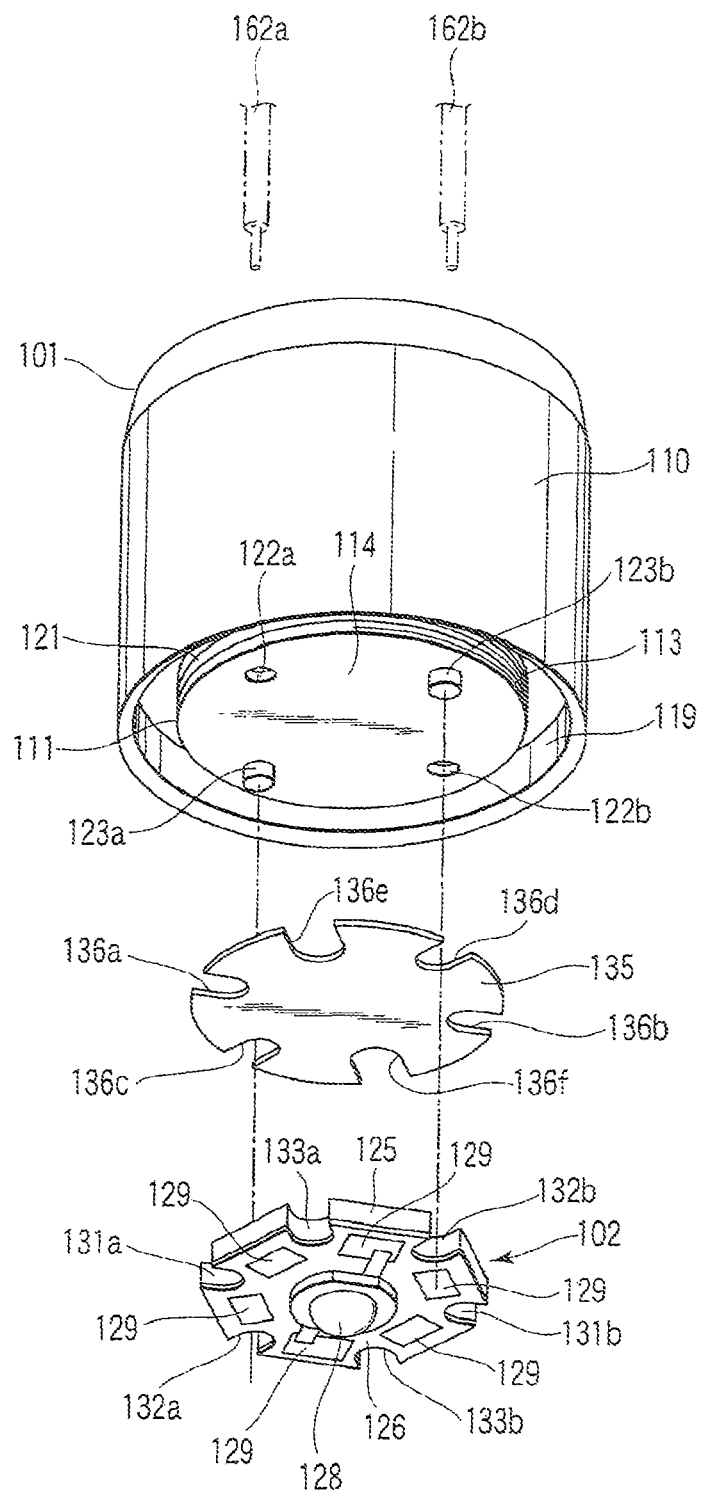
F I G. 24

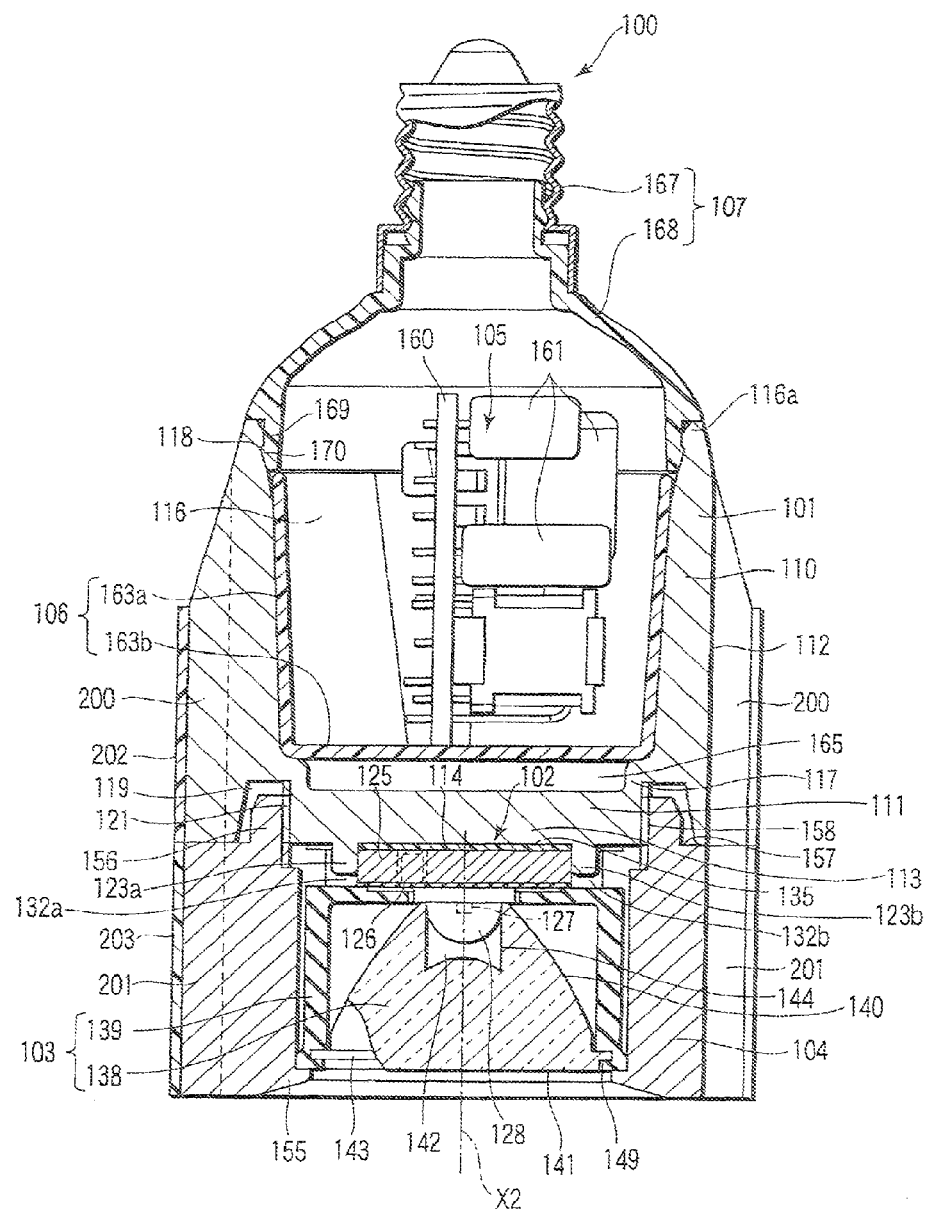
F I G. 26

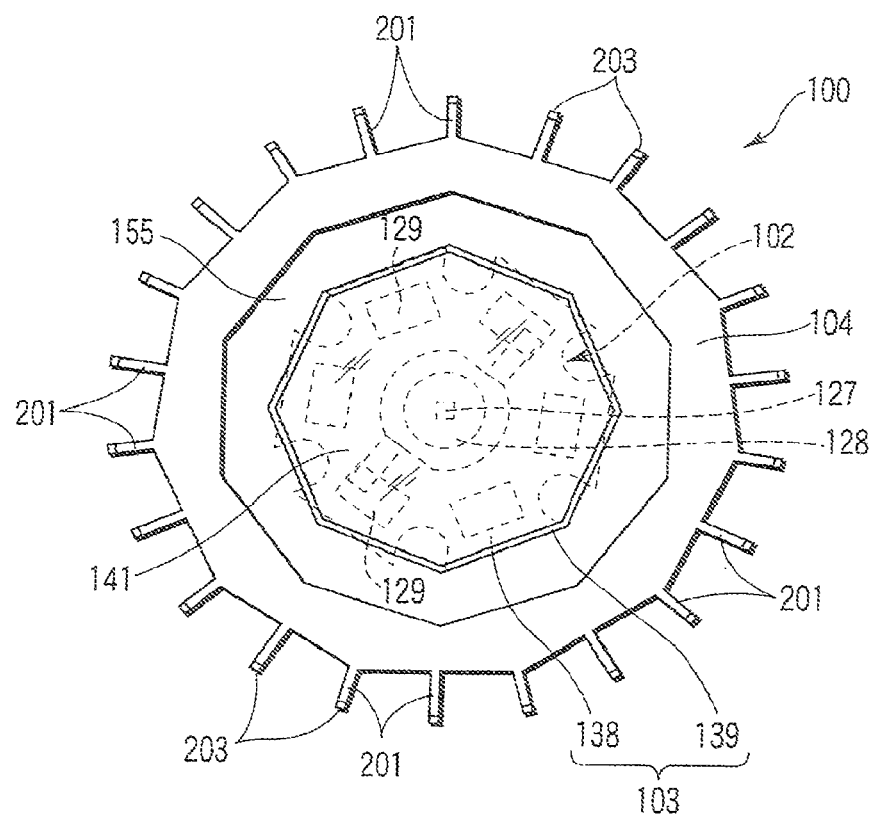
F I G. 27

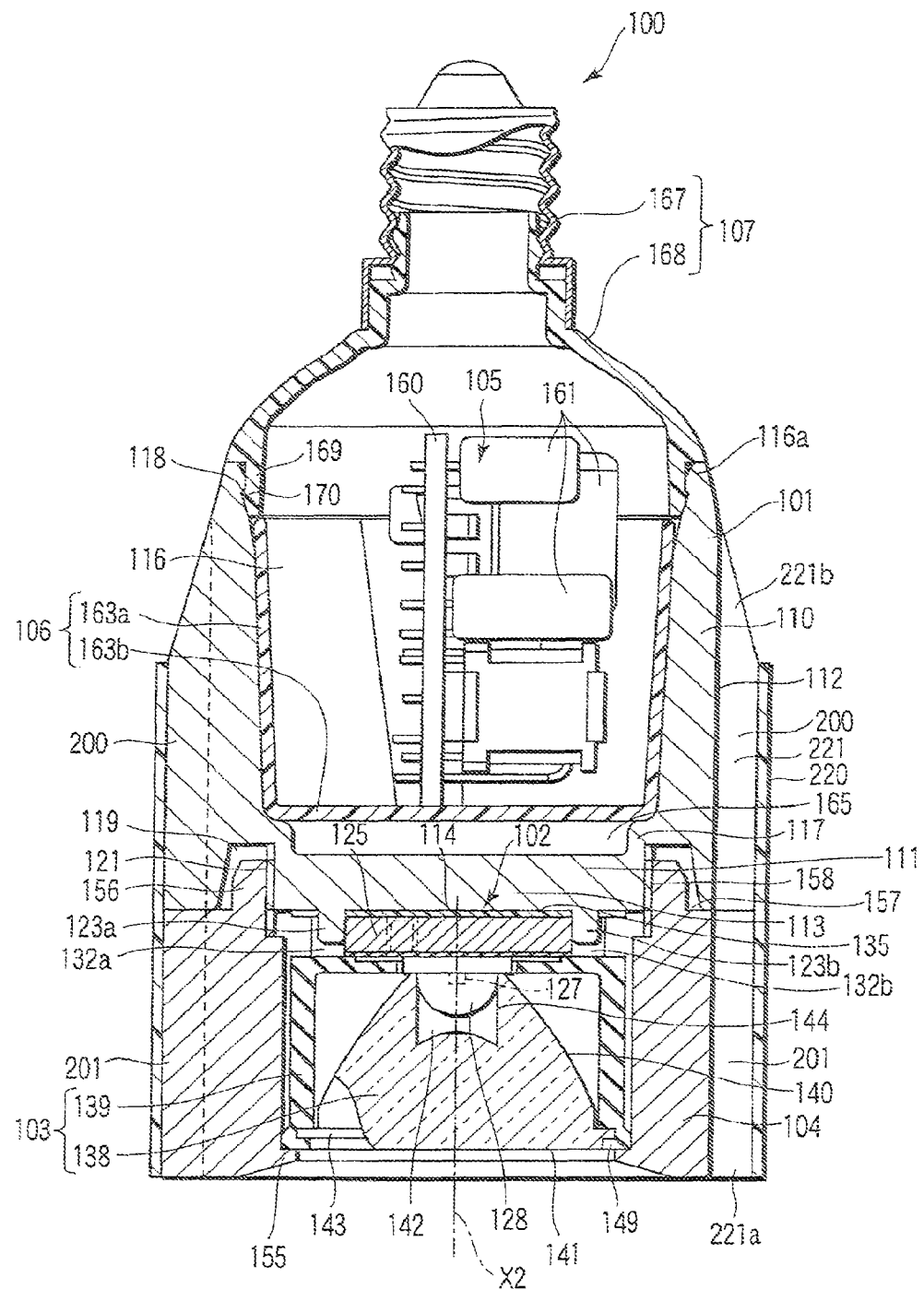
F I G. 28

LAMP HAVING OUTER SHELL TO RADIATE HEAT OF LIGHT SOURCE

CROSS-REFERENCE TO RELATED APPLICATIONS

This application is a continuation of co-pending U.S. application Ser. No. 12/794,379 filed Jun. 4, 2010, which is a continuation of U.S. application Ser. No. 11/399,492 filed Apr. 7, 2006 and issued as U.S. Pat. No. 7,758,223. U.S. application Ser. No. 11/399,492 claims priority to Japanese Patent Application No. 2005-112339 filed Apr. 8, 2005, Japanese Patent Application No. 2005-221571 filed Jul. 29, 2005, Japanese Patent Application No. 2005-221688 filed Jul. 29, 2005; and Japanese Patent Application No. 2005-371406 filed Dec. 26, 2005. The entire contents of all of the applications mentioned above are hereby incorporated by reference.

BACKGROUND OF THE INVENTION

1. Field of the Invention

The present invention relates to a lamp using a semiconductor element like a light-emitting diode as a light source, and more particularly a structure for efficiently radiating the heat generated by a light source during lighting of a lamp.

2. Description of the Related Art

A light-emitting diode is well known as a light source for a lamp compatible with an incandescent lamp. The output of the light-emitting diode is lowered and the life is reduced, as the temperature is increased. Therefore, it is necessary to control the increase of the temperature of the light-emitting diode in the lamp using the light-emitting diode as the light source.

For example, Jpn. Pat. Appln. KOKAI Publication No. 2001-243809 discloses an LED lamp, which prevents overheat of a light-emitting diode by increasing the heat radiation of the light-emitting diode. The conventional LED lamp is provided with a spherical body, a metal substrate, and light-emitting diodes. The spherical body is composed of a metallic radiator having a base at one end and an opening at the other end, and a translucent cover. The metallic radiator has a shape spreading from one end to the other end like a bugle.

The metal substrate is fixed to the opening of the metallic radiator through a high heat conductivity member having electrical insulation. The light-emitting diode is supported by the metal substrate and covered by the translucent cover.

The heat generated by the light-emitting diode during lighting of the LED lamp is transmitted from the metal substrate to the metallic radiator through the high heat conductivity member. The heat transmitted to the metallic radiator is radiated to the atmosphere from the peripheral surface of the metallic radiator. This prevents overheat of the light-emitting diode, and increases the luminous efficiency of the LED lamp.

According to the LED lamp disclosed by the published Japanese patent applications, the metallic radiator to radiate the heat of the light-emitting diode and the metal substrate to mount the light-emitting diode are different components. In this structure, though the metal substrate and the metallic radiator are connected through the high heat conductivity member, it is unavoidable to generate a thermal resistance in a joint of the metal substrate and the metallic radiator. Thus, the conduction of heat between the metal substrate and the metallic radiator disturbed, and the heat of the light-emitting diode cannot be efficiently transmitted from the metal substrate to the metallic radiator. There is a point to be improved to control the temperature increase of the light-emitting diode.

Moreover, in the above-described LED lamp, a lighting circuit to light the light-emitting diode is an indispensable component. When the lighting circuit is incorporated in the LED lamp, it is requested that the size of the LED lamp is not increased by the lighting circuit. It is also known that when the temperature of the lighting circuit is increased, the reliability of the circuit operation is decreased and the life is reduced. Therefore, it is essential to prevent overheat of the lighting circuit when the lighting circuit is incorporated in the LED lamp.

The above-mentioned published Japanese patent applications do not describe about the lighting circuit. The LED lamps disclosed in these applications do not satisfy the demand for preventing the large size of the LED lamp and overheat of the lighting circuit.

BRIEF SUMMARY OF THE INVENTION

According to an embodiment of the present invention, there is provided a lamp comprises; an outer shell with heat conductivity which includes a light source support, and a heat radiating surface exposed to the outside of the outer shell, and the light source support formed integrally with the heat radiating surface; a base which is provided in the outer shell; a light source which is supported on the light source support, heated during lighting, and thermally connected to the light source support; and a cover which is provided in the outer shell so as to cover the light source.

According to an embodiment of the invention, the outer shell may be made of copper with heat conductivity higher than iron-based metal, or a copper alloy composed mainly of copper. A light metal lighter than iron-based metal such as aluminum, and light alloy may be used.

In an embodiment of the invention, the heat radiating surface of the outer shell may be knurled. This makes the heat radiating surface stain finish, and increases the area of the heat radiating surface. Further, coating of a protection film is permitted to prevent rusting of the heat radiating surface of the outer shell. Particularly, if a black protection film is coated, the efficiency of heat radiation from the heat radiating surface to the atmosphere is increased.

In an embodiment of the invention, as a heat generating light source, it is desirable to use a semiconductor element, such as a light-emitting diode which converts electrical energy into light. Instead of the light-emitting diode, an electroluminescence element may be used. The number of light source is one, but not limited to one. The light source may be directly mounted on the light source support to facilitate conduction of heat to the light source support. The light source may also be mounted on a wiring board, and the wiring board may be thermally connected to the light source support.

In an embodiment of the invention, the cover is used to cover and protect the light source. The cover may be shaped in a globe or a shade. If the cover is the globe, a light reflection film may be provided on a part of the inside surface of the globe. The cover may be shaped optionally to diffuse or condense the light emitted from the light source. The cover may be either translucent or transparent. A lens to condense or diffuse the light from the light source may be used as the cover.

According to an embodiment of the invention, the heat generated by the light source during lighting is transmitted from the light source support to the heat radiating surface, and radiated to the outside of the lamp through the heat radiating surface. The light source support is formed integrally with the heat radiating surface, and there is no joints disturbing heat conduction between the heat radiating surface and light source support. Therefore, the heat conduction from the light source support to the heat radiating surface is good, and the heat generated from the light source is efficiently transferred to the heat radiating surface. As a result, the heat radiating performance of the light source is increased, and overheat of the light source is effectively prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a sectional view of the first embodiment of the present invention, with a base, an outer shell and a translucent cover separated;

FIG. 4 is a sectional view taken along line F4-F4 of FIG. 2;

FIG. 7 is a sectional view of the lamp according to the second embodiment of the present invention;

FIG. 12 is a sectional view of a lamp according to a fifth embodiment of the present invention;

FIG. 14 is a sectional view taken along line F14-F14 of FIG. 13;

FIG. 21 is a sectional view of a lamp according to a seventh embodiment of the present invention;

FIG. 22 is a sectional view showing a positional relationship among a light source support of an outer shell, a light source, a light source cover and a holder in the seventh embodiment of the present invention;

FIG. 23 is a sectional view showing a positional relationship among the light source cover, the holder and a heat shielding cover in the seventh embodiment of the present invention;

FIG. 24 is an exploded perspective view showing a positional relationship among the outer shell, a heat conduction sheet and the light source in the seventh embodiment of the present invention;

FIG. 26 is a sectional view of a lamp according to an eighth embodiment of the present invention;

FIG. 27 is a plan view of the lamp according to the eighth embodiment of the present invention;

FIG. 28 is a sectional view of a lamp according to a ninth embodiment of the present invention.

DETAILED DESCRIPTION OF THE INVENTION

A first embodiment of the present invention will be explained hereinafter with reference to FIG. 1 to FIG. 5.

Figure 1:
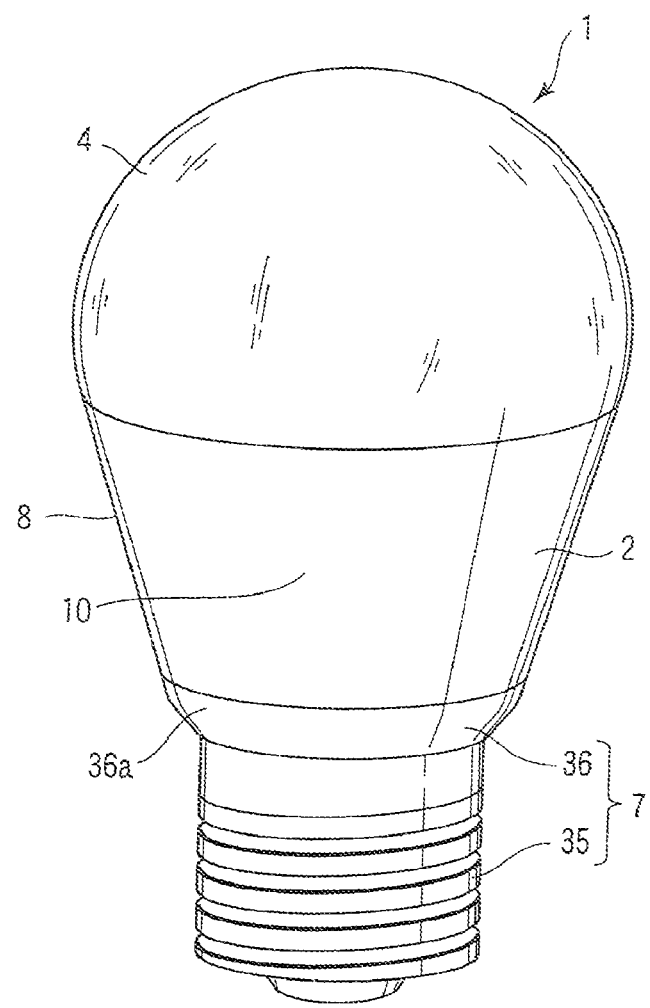
FIG. 1 is a perspective view of a lamp according to a first embodiment of the present invention.
Figure 2:
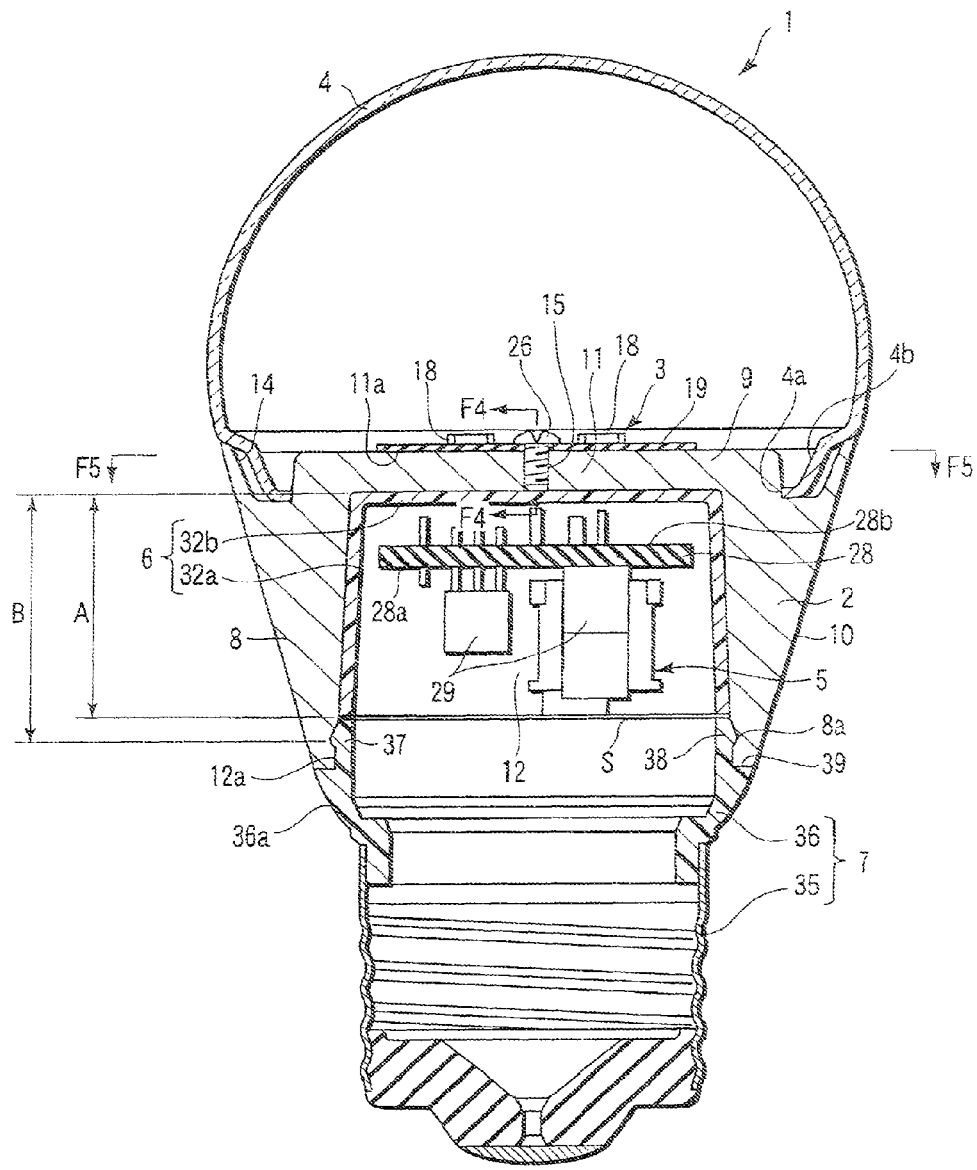
FIG. 2 is a sectional view of the lamp according to the first embodiment of the present invention.

FIG. 1 and FIG. 2 show a bulb-type lamp 1 compatible with an incandescent lamp. The lamp 1 includes an outer shell 2, a light source 3, a translucent cover 4, a lighting circuit 5, an insulating member 6, and a base 7.

The outer shell 2 is made of metallic material such as aluminum with excellent heat conductivity. As shown in FIG. 2 and FIG. 3, the outer shell 2 has a peripheral wall 8 and an end wall 9. The peripheral wall 8 and the end wall 9 are formed integrally. The peripheral wall 8 is cylindrical. The outer circumference of the peripheral wall 8 is a heat radiating surface 10 exposed outside the lamp 1. The heat radiating surface 10 is tapered with the outside diameter decreased gradually from one end to the other end along the axial direction of the peripheral wall 8.

The end wall 9 closes one end of the peripheral wall 8. The end wall 9 forms a circular plate light source support 11. The light source support 11 has a flat supporting surface 11a exposed outside the outer shell 2.

In the first embodiment, the heat radiating surface 10 of the outer shell 2 may be knurled and stain finished. This can increase the area of the heat radiating surface 10. The heat radiating surface 10 may be coated with a protection film to prevent rusting. If a black protection film is coated, the efficiency of heat radiation from the heat radiating surface 10 to the atmosphere is increased.

As shown in FIG. 2 and FIG. 3, the outer shell 2 has a receptacle 12. The receptacle 12 is defined by a space surrounded by the peripheral wall 8 and the end wall 9, and positioned inside the heat radiating surface 10. The receptacle 12 has an open end 12a opposite to the end wall 9. The open end 12a is positioned at the other end of the peripheral wall 8.

The peripheral wall 8 has an inner peripheral surface exposed to the receptacle 12. An engaging groove 8a is formed on the inner peripheral surface. The engaging groove 8a is positioned at the open end 12a of the receptacle 12, and continued in the circumferential direction of the peripheral wall 8. A recession 14 is formed in the outer circumference of the end wall 9. The recession 14 is circular surrounding the light source support 11, and opened outward of the outer shell 2.

As shown in FIG. 2 to FIG. 4, the light source support 11 has one screw hole 15 and a pair of through holes 16a and 16b. The screw hole 15 is positioned at the center of the light source support 11. The through holes 16a and 16b are positioned parallel to each other on both sides of the screw hole 15. One end of the screw hole 15 and the ends of the through holes 16a and 16b are opened to the supporting surface 11a of the light source support 11. The other end of the screw hole 15 and the other ends of the through holes 16a and 16b are opened to the receptacle 12.

Figure 5:
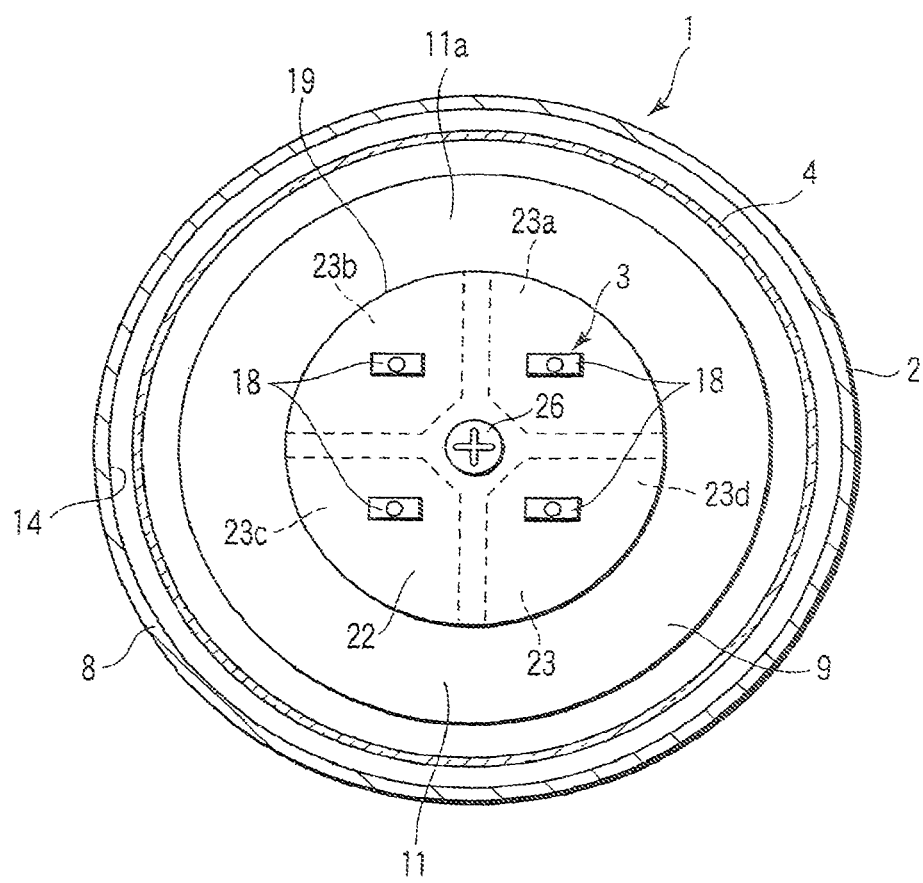
FIG. 5 is a sectional view taken along line F5-F5 of FIG. 2.

As shown in FIG. 4 and FIG. 5, the light source 3 includes four light-emitting diodes 18 shaped like a chip, for example. The light-emitting diodes 18 are an example of a point source of light, and mounted in two lines on a circular wiring board 19. The wiring board 19 has an insulating substrate 20. The insulating substrate 20 has a first surface 20a and a second surface 20b. The second surface 20b is positioned on the opposite side of the first surface 20a.

A pattern layer 21 and a resist layer 22 are stacked on the first surface 20a of the insulating substrate 20. The pattern layer 21 is made of metal foil such as copper. The resist layer 22 covers the pattern layer 21. A thermal diffusion layer 23 and a resist layer 24 are stacked on the second surface 20b of the insulating substrate 20. The thermal diffusion layer 23 is made of metal foil with excellent heat conductivity such as an alloy. The thermal diffusion layer 23 is thicker than the pattern layer 21 to ensure heat capacity. As shown in FIG. 5, the thermal diffusion layer 23 is divided into four areas 23a, 23b, 23c and 23d. The areas 23a, 23b, 23c and 23d are separated, and correspond to the mounting positions of the light-emitting diodes 18. The resist layer 24 covers the thermal diffusion layer 23. The light-emitting diodes 18 are mounted on the first surface 20a of the insulating substrate 20, and electrically connected to the pattern layer 21.

As the wiring board 19, a pattern layer, a thermal diffusion layer and a resist layer may be stacked on a metal substrate with excellent heat conductivity. However, considering the cost, it is desirable to use a resin substrate made of epoxy resin mixed with glass powder as the insulating substrate 20, and to stack a pattern layer, a thermal diffusion layer and a resist layer on the resin substrate.

The wiring board 19 is stacked on the light source support 11 with the thermal diffusion layer 23 faced to the supporting surface 11a of the light source support 11. The wiring board 19 is fixed to the light source support 11 through a screw 26. The screw 26 is inserted into the screw hole 15 penetrating the center of the wiring board 19. With this insertion of the screw, the wiring board 19 is fixed tightly to the supporting surface 11a of the light source support 11, and the wiring board 19 is thermally connected to the light source support 11.

Therefore, the heat generated by the light-emitting diode 18 is transmitted from the insulating substrate 20 to the thermal diffusion layer 23, and diffused widely to every corner of the thermal diffusion layer 23. The heat diffused to the heat diffusion layer 23 is transmitted to the light source support 11 through the resist layer 24.

According to the first embodiment, a heat conduction path from the wiring board 19 to the supporting surface 11a is formed in the light source support 11 of the outer shell 2. To control the thermal resistance of the heat conduction path, it is desirable to fill a heat-conducting substance consisting mainly of silicon, such as grease between the wiring board 19 and the supporting surface 11a.

The translucent cover 4 is a globe made of synthetic resin, for example, and is formed spherical having an opening 4a at one end. The translucent cover 4 is held by the outer shell 2 by fitting an edge 4b defining the opening 4a into the recession 14 of the outer shell 2. The translucent cover 4 hides the light source support 11, light-emitting diodes 18 and wiring board 19. Therefore, the light-emitting diodes 18 are faced to the inside surface of the translucent cover 4.

The lighting circuit 5 is used to light up the light-emitting diodes 18, and unified as one module. As shown in FIG. 2, the lighting circuit 5 has a wiring board 28 and circuit components 29. The wiring board 28 has a first surface 28a and a second surface 28b positioned on the opposite side of the first surface 28a. The circuit components 29 are mounted on the first surface 28a of the wiring board 28. The circuit components 29 have lead terminals. The lead terminals are soldered to conductor patterns (not shown) printed on the wiring bard 28, penetrating through the wiring board 28.

The lighting circuit is housed in the receptacle 12 of the outer shell 2. The lighting circuit 5 has lead wires 30a and 30b electrically connected to the light-emitting diodes 18, and a lead wire (not shown) electrically connected to the base 7. The lead wires 30a and 30b are led to the wiring board 19, penetrating through the through holes 16a and 16b formed on the end wall 9. The lead wires 30a and 30b are connected to the pattern layer 21 of the wiring board 19 by means of soldering. Therefore, as shown in FIG. 2, when the translucent cover 4 is directed to the lamp 1 located on the outer shell 2, the lighting circuit 5 is suspended from the light support 11 by the lead wires 30a and 30b.

The insulating member 6 is an example of insulating layer for electrically insulating between the outer shell 2 and the lighting circuit 5. The insulating member 6 is a molding using synthetic resin material, such as polybutylene terephthalate. As shown in FIG. 2, the insulating member 6 is cup-shaped having a cylindrical peripheral wall 32a and a closed wall 32b closing one end of the peripheral wall 32a. The closed wall 32b has a pair of through holes 33a and 33b to pass the lead wires 30a and 30b. The axial length A of the insulating member 6 is shorter than the axial length B from the light source support 11 to the engaging groove 8a of the outer shell 2.

The insulating member 6 is fit in the receptacle 12 through the open end 12a. Therefore, the peripheral wall 32a of the insulating member 6 covers the internal circumference of the peripheral wall 8 of the outer shell 2, and the closed wall 32b of the insulating member 6 covers the inside surface of the end wall 9 of the outer shell 2. The insulating member 6 partitions the outer shell 2 and the lighting circuit 5.

The base 7 is used to supply a current to the lighting circuit 5. The base 7 has a metal base shell 35, and a connecting member 36 fixed to the base shell 35. The base shell 35 is removably screwed into a lamp socket of a not-shown light fixture. The connecting member 36 is a molding using synthetic resin material, such as polybutylene terephthalate, and has electrical insulation. The connecting member 36 has a peripheral surface 36a, which is formed to have a cylindrical hollow and curved circularly.

As shown in FIG. 2, the connecting member 36 has a distal end 37 to fit in the inside of the open end 12a of the receptacle 12. The distal end 37 has an engaging projection 38 on the peripheral surface. The engaging projection 38 engages with the engaging groove 8a when the distal end 37 is fit inside the open end 12a. By this engagement, the outer shell 2 and the base 7 are coaxially connected. The connecting member 36 is interposed between the base shell 35 and the outer shell 2, insulating them electrically and thermally.

In the state that the connecting member 36 is connected to the outer shell 2, the peripheral surface 36a of the connecting member 36 is continued to the heat radiating surface 10 of the outer shell 2. A step 39 is formed in the base of the distal end 37. The step 39 has a flat surface, which is continued in the circumferential direction of the connecting member 36, and extending in the radial direction of the connecting member 36. The step 39 butts against the open end 12a, when the distal end 37 of the connecting member 36 is inserted into the open end 12a of the receptacle 12. This controls the insertion depth of the distal end 37 of the connecting member 36 into the receptacle 12.

As the insertion depth of the distal end 37 is controlled, a space S is generated between the distal end 37 of the connecting member 36 and the peripheral wall 32a of the insulating member 6. The existence of the space S prevents interference of the distal end 37 with the insulating member 6 before the engaging projection 38 engages with the engaging groove 8a. In other words, Failure in engagement between the engaging projection 38 and the engaging groove 8a caused by a dimensional tolerance of the connecting member 36 and outer shell 2 is prevented. Therefore, the base 7 can be surely connected to the open end 12a of the receptacle 12.

In the lamp 1 of the first embodiment, when the lamp 1 is lit, the light-emitting diodes 18 are heated. The light-emitting diodes 18 are cooled in the following process, in addition to the cooling by conviction of the air generated within the translucent cover 4.

The heat of the light-emitting diodes 18 are transmitted to the light source support 11 of the outer shell 2 through the wiring board 19. The heat transmitted to the light source support 11 is transmitted from the end wall 9 to the heat radiating surface 10 through the peripheral wall 8, and radiated to the outside of the lamp 1 through the heat radiating surface 10.

The light source support 11 receiving the heat of the light-emitting diodes 18 is formed integrally with the peripheral wall 8 having the heat radiating surface 10. There is no joint to disturb the conduction of heat on the heat conduction path from the light source support 11 to the heat radiating surface 10, and the thermal resistance of the heat conduction path is decreased. Therefore, the heat of the light-emitting diodes 18 transmitted to the light source support 11 can be efficiently escaped to the heat radiating surface 10.

In addition, in the first embodiment, the circular recession 14 surrounding the light source support 11 is formed in the end wall 9 of the outer shell 2, and the recession 14 is opened outward of the outer shell 2. The existence of the recession 14 increases the surface area of the outer shell 2, and increases the amount of heat radiation from the outer shell 2 though the shape of the outer shell 2 is restricted by the appearance of the lamp 1.

As a result, the cooling performance of the light-emitting diodes 18 is increased, and overheat of the light-emitting diodes 18 is prevented. Therefore, the decrease of the light-emitting efficiency of the light-emitting diodes 18 can be controlled, and the life of the light-emitting diodes 18 can be made long.

Moreover, the light-emitting diodes 18 are mounted on the wiring board 19 having the thermal diffusion layer 23, and the heat generated by the light-emitting diodes 18 are diffused to every corner of the wiring board 19 through the thermal diffusion layer 23 of the wiring board 19. Therefore, the heat of the light-emitting diodes 18 can be transmitted from a wide area of the wiring board 19 to the light source support 11. This improves the heat conduction from the light-emitting diodes 18 to the light source support 11, and increases the cooling performance of the light-emitting diodes 18.

Further, the lamp 1 of the first embodiment has the receptacle 12 to contain the lighting circuit 5 inside the outer shell 2. This eliminates the necessity of arranging the lighting circuit 5 and outer shell 2 in the axial direction of the lamp 1. Therefore, the length of the lamp 1 in the axial direction can be reduced, and the compact lamp 1 can be provided.

The lighting circuit 5 contained in the receptacle 12 is electrically insulated from the outer shell 2 through the insulating member 6. Therefore, the lighting circuit 5 can be incorporated in the outer shell 2, while the outer shell 2 is made of metal to increase the heat radiation performance.

The cup-shaped insulating member 6 for electrically insulating the outer shell 2 and the lighting circuit 5 is a synthetic resin molding with the heat conductivity lower than the outer shell 2. Therefore the insulating member 6 can thermally shield the lighting circuit 5 from the outer shell 2, and prevents conduction of the heat of the light-emitting diodes 18 to the lighting circuit 5 through the outer shell 2. As a result, the lighting circuit 5 is protected from the heat of the light-emitting diodes 18. This prevents a malfunction of the lighting circuit 5, and makes the life of the lighting circuit 5 long.

The receptacle 12 containing the lighting circuit 5 is surrounded by the peripheral wall 8 and the end wall 9 of the outer shell 2, and the open end 12a of the receptacle 12 is closed by the base 7. In other words, the lighting circuit 5 is contained in a space portioned by the outer shell 2 and base 7. The air outside the lamp 1 does not flow in this space. This prevents adhesion of dust in the air to the lighting circuit 5 causing a tracking phenomenon.

Figure 6:
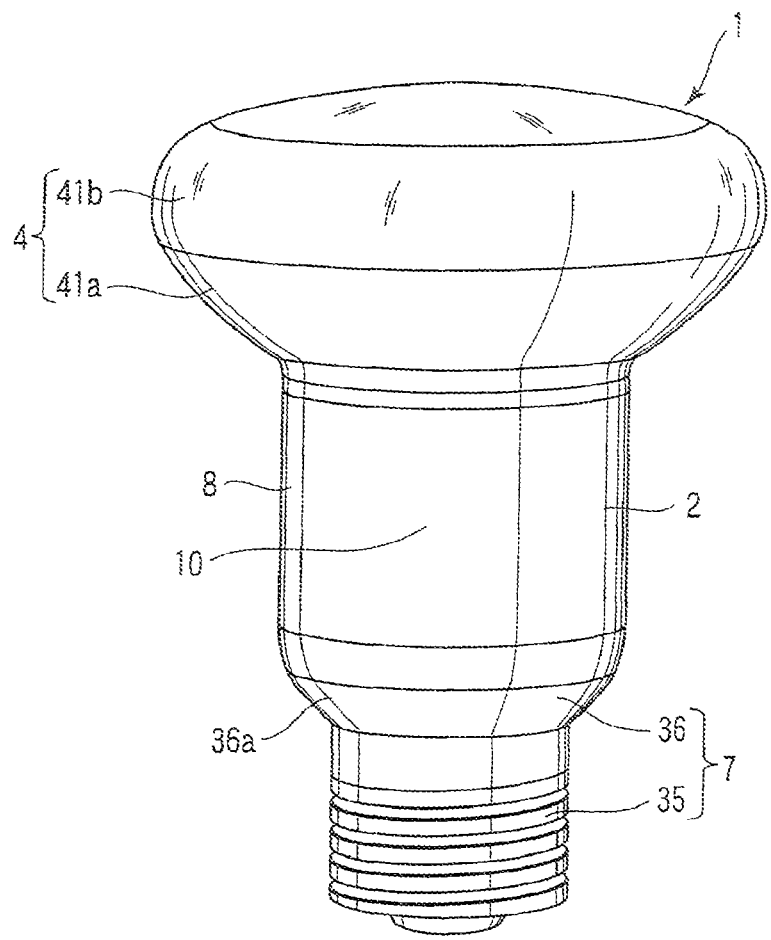
FIG. 6 is a perspective view of a lamp according to a second embodiment of the present invention.

FIG. 6 and FIG. 7 show a second embodiment of the invention.

The second embodiment is different from the first embodiment in the outer shell 2 and translucent cover 4. The other components of the lamp 1 and technical effects are the same as those of the first embodiment. Therefore, the same components as those of the first embodiment are given same reference numerals, and explanation of these components will be omitted.

As shown in FIG. 6 and FIG. 7, in the lamp 1 according to the second embodiment, the outside diameter of the peripheral wall 8 of the outer shell 2 is constant except the end portion adjacent to the open end 12a of the receptacle 12 of the outer shell 2. Therefore, the outer shell 2 is shaped like a straight cylinder.

A globe as the translucent cover 4 has a reflection portion 41a and a projection portion 41b. The reflection portion 41a has an opening 42a opened to the light source support 11, and an edge 42b defining the opening 42a. The edge 42b is fit in the recession 14 of the outer shell 2. The reflection portion 41a is tapered to increase the diameter gradually from the edge 42b. A light reflection film 43 is stacked on the inside surface of the reflection portion 41a.

The projection portion 41b is formed integrally with the reflection portion 41a so as to continue to the reflection portion 41a. The projection portion 41b is faced to the light reflection film 43 and light-emitting diodes 18.

With the translucent cover 4 formed as described above, a part of the light from the light-emitting diodes 18 can be reflected to the projection portion 41b by using the light reflection film 43. Therefore, most of the light from the light-emitting diodes 18 can be condensed by the projection portion 41b, and projected to the outside of the lamp 1.

As shown in FIG. 7, the outer shell 2 has a stopper 45 at the corner defined by the peripheral wall 8 and the end wall 9. The stopper 45 is formed circular, projecting from the inside surface of the peripheral wall 8 and continuing to the inner circumference of the peripheral wall 8. The stopper 45 is not limited to the circular form. For example, stoppers projecting from the inner circumference of the peripheral wall 8 may be arranged with intervals in the circumferential direction of the peripheral wall 8.

The inside diameter of the stopper 45 is smaller than the outside diameter of the closed wall 32*b* of the insulating member 6. Therefore, the stopper 45 is interposed between the end wall 9 and the closed wall 32*b* of the insulating member 6, even in the state that the insulating member 6 is fit in the receptacle 12 of the outer shell 2. As a result, the light source support 11 on the end wall 9 is separated from the insulating member 6, and a gap 46 is provided therebetween.

According to the lamp 1 of the second embodiment, the existence of the gap 46 keeps the light source support 11 to receive the heat of the light-emitting diodes 18 non-contacting with the insulating member 6. The gap 46 functions as a heat shielding space to prevent conduction of heat from the light source support 11 to the insulating member 6, and the heat of the light-emitting diodes 18 are difficult to transmit directly from the light source support 11 to the insulating member 6.

Therefore, though the lighting circuit 5 is contained in the outer shell 2 which receives and radiates the heat of the light-emitting diodes 18, the influence of heat to the lighting circuit 5 can be minimized. This prevents a malfunction of the lighting circuit 5, and makes the life of the lighting circuit 5 long.

Figure 8:
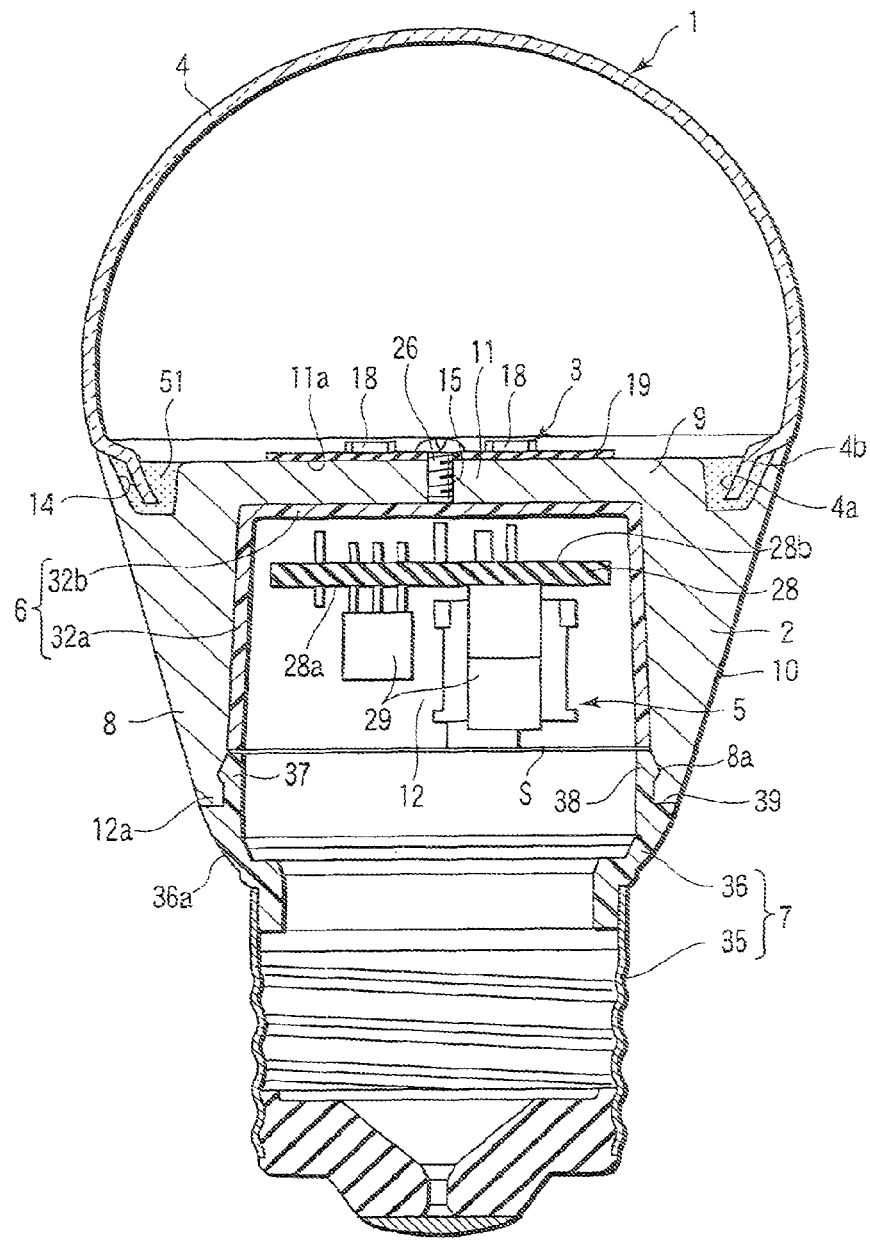
FIG. 8 is a sectional view of a lamp according to a third embodiment of the present invention.

FIG. 8 shows a third embodiment of the invention.

The third embodiment is different from the first embodiment in the method of fixing the translucent cover 4 to the outer shell 2. The other components of the lamp 1 and technical effects are the same as those of the first embodiment. Therefore, the same components as those of the first embodiment are given same reference numerals, and explanation of these components will be omitted.

As shown in FIG. 8, the edge 4*b* of the translucent cover 4 is fixed to the recession 14 of the outer shell 2 through a silicon-based adhesive 51. The adhesive 51 is filled in the recession 14. The recession 14 is formed surrounding the light source support 11, and caved in toward the base 7 from the supporting surface 11*a* to fix the wiring board 19. Therefore, the adhesive 51 is provided at the position displaced to the base 7 from the light-emitting diodes 18 on the wiring board 19.

According to the lamp 1 of the third embodiment, the adhesive 51 to fix the translucent cover 4 to the outer shell 2 is filled in the recession 14 caved in from the supporting surface 11*a* of the light source support 11. Therefore, the light from the light-emitting diodes 18 is difficult to apply directly to the adhesive 51. This prevents deterioration of the adhesive 51, even if the light from the light-emitting diodes 18 includes an ultraviolet ray. Therefore, the translucent cover 4 is securely fixed to the outer shell 2 for a long period.

Figure 9:
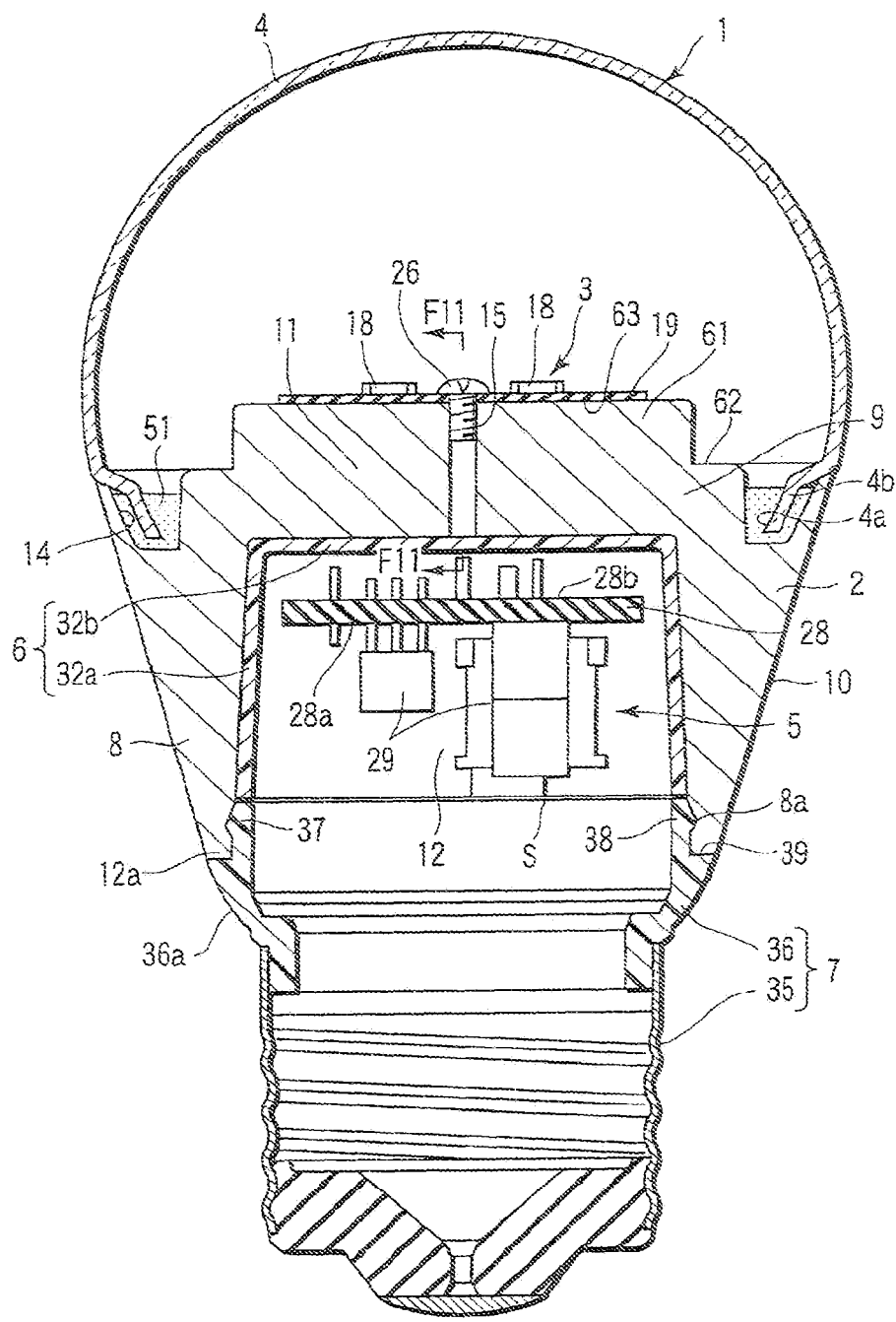
FIG. 9 is a sectional view of a lamp according to a fourth embodiment of the present invention.
Figure 10:
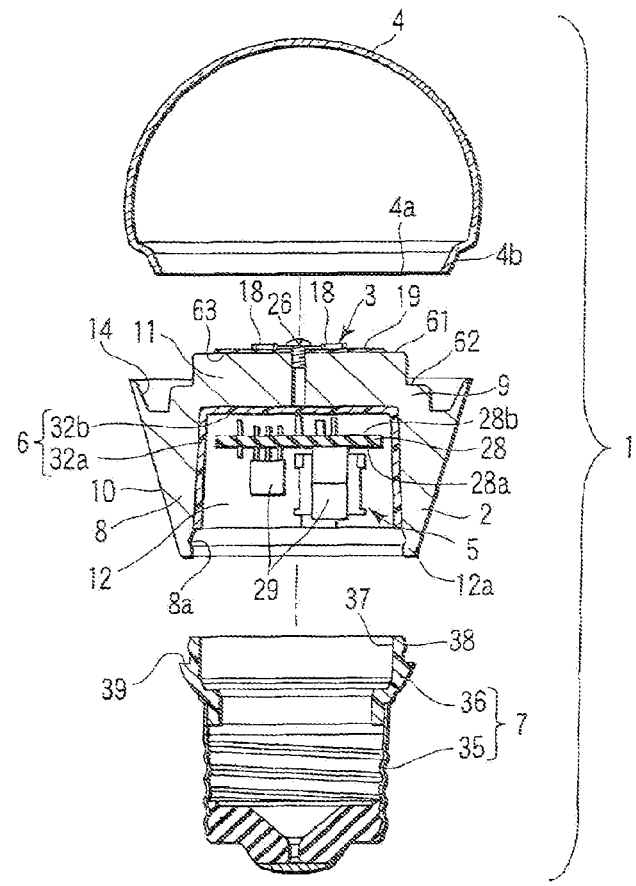
FIG. 10 is a sectional view of the lamp according to the fourth embodiment of the present invention, with a base, an outer shell and a translucent cover separated.
Figure 11:
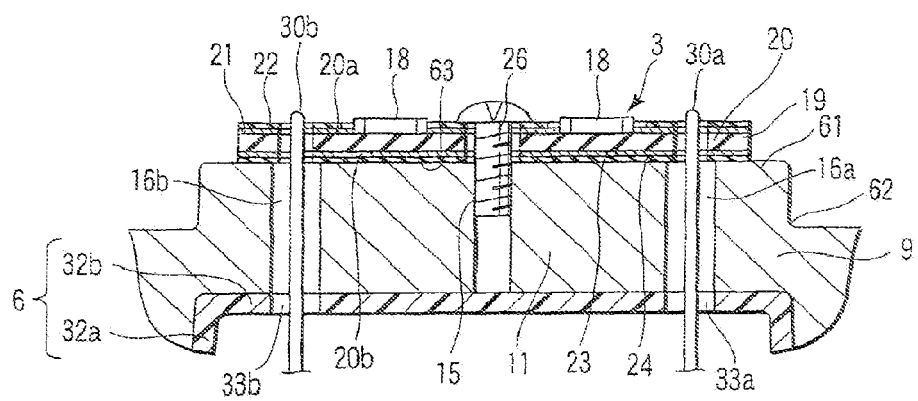
FIG. 11 is a sectional view taken along line F11-F11 of FIG. 9.

FIG. 9 to FIG. 11 shows a fourth embodiment of the invention.

The fourth embodiment is different from the third embodiment in the shape of the light support 11 of the outer shell 2. The other components of the lamp 1 and technical effects are the same as those of the third embodiment. Therefore, the same components as those of the third embodiment are given same reference numerals, and explanation of these components will be omitted.

As shown in FIG. 9 to FIG. 11, the end wall 9 of the outer shell 2 has a projection 61 projecting from the light source support 11 to the translucent cover 4. The projection 61 is formed circular one size smaller than the light source support 11. The projection 61 is formed integrally with the end wall 9, and surrounded coaxially by the recession 14 to fix the translucent cover 4. Therefore, one step 62 is formed between the projection 61 and light source support 11. The step 62 is circular continuing to the circumferential direction of the projection 61.

A flat supporting surface 63 is formed at the end of the projection 61. The supporting surface 63 is placed inside the translucent cover 4 more closely to the center than the end wall 9 of the outer shell 2. Therefore, the supporting surface 63 is farther from the recession 14 by the distance equivalent to the height of the projection 61.

In the fourth embodiment, the wiring board 19 with the light-emitting diodes 18 mounted is fixed to the center of the supporting surface 63 through the screw 26. The wiring board 19 is thermally connected to the supporting surface 63. The screw hole 15 and through holes 16*a*/16*b* are opened to the supporting surface 63, penetrating through the projection 61.

According to the lamp 1 of the fourth embodiment, the projection 61 projecting to the translucent cover 4 is formed in the light support 11 of the outer shell 2, and the wiring board 19 having the light-emitting diodes 18 is fixed to the end surface 63 of the projection 61. Therefore, the light-emitting diodes 18 are displaced to be inside the translucent cover 4 more closely to the center than the end wall 9 of the outer shell 2. This efficiently guides the light from the light-emitting diodes 18 to the inside of the translucent cover 4, and permits radiation of the light from here to the outside of the translucent cover 4.

Further, the existence of the projection 61 increases the surface area and heat capacity of the light source support 11. This increases the amount of heat radiation from the outer shell 2, though the shape of the outer shell 2 is restricted by the appearance of the lamp 1. As a result, the cooling performance of the light-emitting diodes 18 is increased, overheat of the light-emitting diodes 18 is prevented, and the life of the light-emitting diodes 18 can be made long.

The light-emitting diodes 18 are farther from the adhesive 51 filled in the recession 14 by the distance equivalent to the height of the projection 61. In other words, the light from the light-emitting diodes 18 to the recession 14 is blocked by the outer circumference of the projection 61, and the light from the light-emitting diodes 18 is difficult to apply directly to the adhesive 51.

This prevents deterioration of the adhesive 51, even if the light from the light-emitting diodes 18 includes an ultraviolet ray. Therefore, the translucent cover 4 is securely fixed to the outer shell 2 for a long period.

FIG. 12 shows a fifth embodiment of the invention.

The fifth embodiment is different from the second embodiment in the shape of the light source support 11 of the outer shell 2. The other components of the lamp 1 and technical effects are the same as those of the second embodiment. Therefore, the same components as those of the second embodiment are given same reference numerals, and explanation of these components will be omitted.

As shown in FIG. 12, the end wall 9 of the outer shell 2 has a projection 71 projecting from the light source support 11 to the translucent cover 4. The projection 71 is formed circular one size smaller than the light source support 11. The projection 71 is formed integrally with the end wall 9, and surrounded coaxially by the recession 14 to fix the translucent cover 4. Therefore, one step 72 is formed between the projection 71 and light source support 11. The step 72 is circular continuing to the circumferential direction of the projection 71.

A flat supporting surface 73 is formed at the end of the projection 71. The supporting surface 73 is placed inside the reflection portion 41*a* of the translucent cover 4 more closely to the center than the end wall 9 of the outer shell 2. Therefore, the supporting surface 73 is farther from the recession 14 by the distance equivalent to the height of the projection 71.

In the fifth embodiment, the wiring board 19 with the light-emitting diodes 18 mounted is fixed to the center of the supporting surface 73 through the screw 26. The wiring board 19 is thermally connected to the supporting surface 73. The screw hole 15 and through holes 16*a*/16*b* are opened to the supporting surface 73, penetrating through the projection 71.

According to the lamp 1 of the fifth embodiment, the light-emitting diodes 18 are displaced to be inside the reflection portion 41*a* of the translucent cover 4 more closely to the center than the end wall 9 of the outer shell 2. This efficiently guides the light from the light-emitting diodes 18 to the inside of the translucent cover 4. Therefore, the light from the light-emitting diodes 18 can be reflected to the projection portion 41*b* through the light reflection film 43, and radiated from the projection portion 41*b* to the outside of the translucent cover 4.

Further, the existence of the projection 71 increases the surface area and heat capacity of the light source support 11. This increases the amount of heat radiation from the outer shell 2, though the shape of the outer shell 2 is restricted by the appearance of the lamp 1. As a result, the cooling performance of the light-emitting diodes 18 is increased, overheat of the light-emitting diodes 18 is prevented, and the life of the light-emitting diodes 18 can be made long.

FIG. 13 to FIG. 20 shows a sixth embodiment of the invention.

The sixth embodiment is different from the first embodiment in the method of supporting the lighting circuit 5 to the receptacle 12 of the outer shell 2. The other components of the lamp 1 and technical effects are the same as those of the first embodiment. Therefore, the same components as those of the first embodiment are given same reference numerals, and explanation of these components will be omitted.

Figure 13:
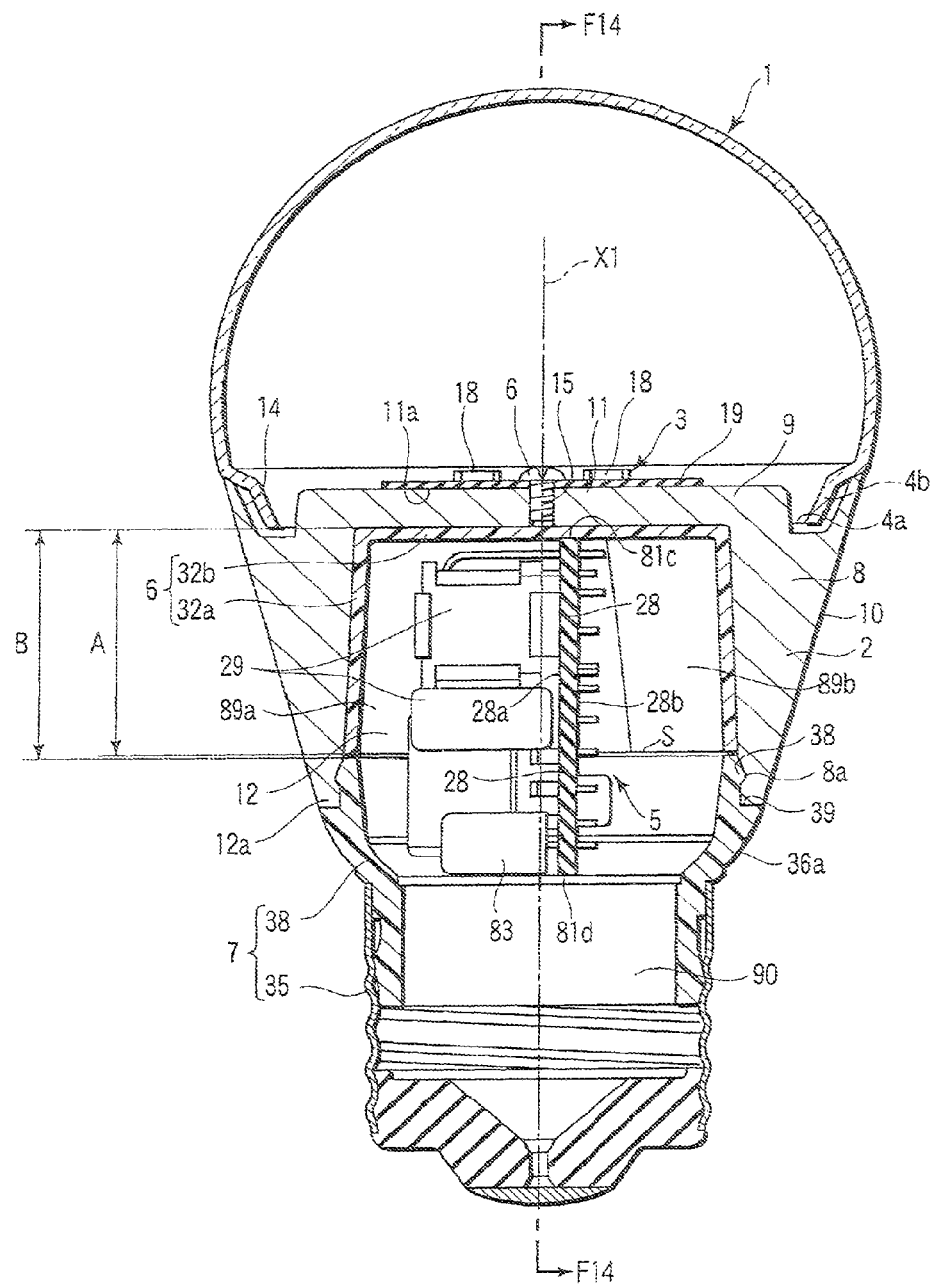
FIG. 13 is a sectional view of a lamp according to a sixth embodiment of the present invention.

As shown in FIG. 13 and FIG. 14, the wiring board 28 constituting the lighting circuit 5 is formed rectangular in the axial direction of the peripheral wall 8 of the outer shell 2. The wiring board 28 has first to fourth edges 81*a*, 81*b*, 81*c* and 81*d*. The first and second edges 81*a* and 81*b* are extended along the axial direction of the peripheral wall 8. The third and fourth edges 81*c* and 81*d* are extended along the radial direction of the peripheral wall 8. The third edge 81*c* butts against the closed wall 32*b* of the insulating member 6. The fourth edge 81*d* faces to the base 7.

A first engaging part 82*a* is formed at the corner of the wiring board 28 defined by the first edge 81*a* and fourth edge 81*d*. Similarly, a second engaging part 82*b* is formed at the corner of the wiring board 28 defined by the second edge 81*b* and fourth edge 81*d*. The first and second engaging parts 82*a* and 82*b* are formed by notching two corners of the wiring board 28 rectangularly. The first and second engaging parts 82*a* and 82*b* are not limited to the notching. For example, projections projecting to the peripheral wall 8 may be provided at two corners of the wiring board 28, and these projections may be used as the first and second engaging parts 82*a* and 82. Or, two corners themselves of the wiring board 28 may be used as the first and second engaging parts 82*a* and 82*b*.

The wiring board 28 projects from the open end 12*a* of the receptacle 12 to the inside of the connecting member 36 of the base 7. In other words, the wiring board 28 extends over the outer shell 2 and the base 7, and the fourth edge 81*d* is placed inside the connecting member 36.

As shown in FIG. 13, the circuit components 29 composing the lighting circuit 5 include a condenser 83. The condenser 83 is weak to heat, and has a characteristic that the life is reduced when heated. The condenser 83 is mounted at the end portion of the first surface 28*a* of the wiring board 28 adjacent to the fourth edge 81*d* by means of soldering.

Further, the lead terminal of each of the circuit components 29 projects from the second surface 28*b* of the wiring board 28, penetrating the wiring board 28. Chip components 84 are mounted on the second surface 28*b*.

As shown in FIG. 14, a pair of stoppers 85*a* and 85*b* is formed on the internal circumference of the connecting member 36. The stoppers 85*a* and 85*b* project from the internal circumference of the connecting member 36 so as to correspond to the first and second engaging parts 82*a* and 82*b* of the wiring board 28. The stoppers 85*a* and 85*b* contact the first and second engaging parts 82*a* and 82*b* of the wiring board 28. Therefore, the wiring board 28 is held between the stoppers 85*a* and 85*b* of the base 7 and the end wall 9 of the outer shell 2.

Figure 17:
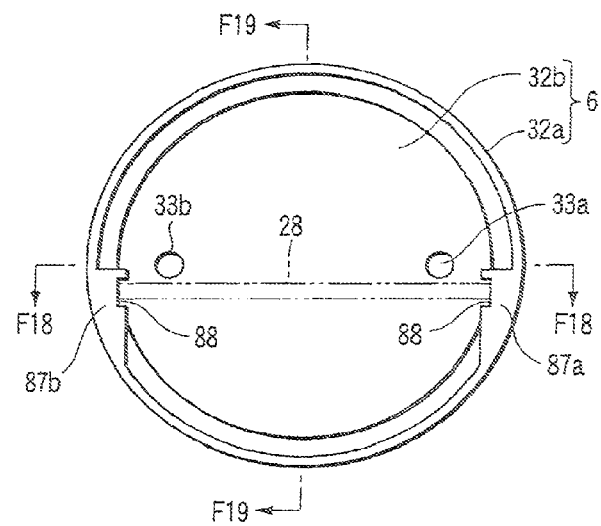
FIG. 17 is a plan view of an insulating material used in the sixth embodiment of the present invention.
Figure 18:
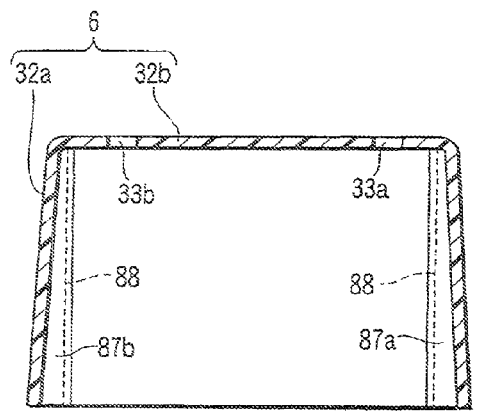
FIG. 18 is a sectional view taken along line F18-F18 of FIG. 17.
Figure 19:
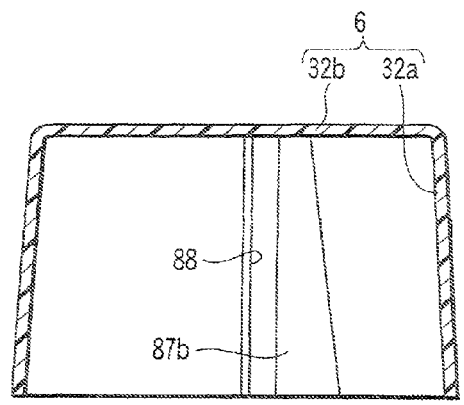
FIG. 19 is a sectional view taken along line F19-F19 of FIG. 17.
Figure 20:
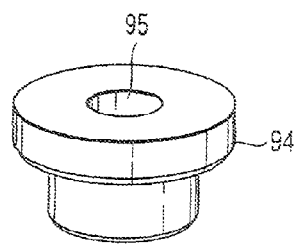
FIG. 20 is a perspective view of the insulating cylinder used in the sixth embodiment of the present invention.

As shown in FIG. 17 to FIG. 19, a pair of guides 87*a* and 87*b* is formed integrally on the internal circumference of the peripheral wall 32*a* of the insulating member 6. The guides 87*a* and 87*b* are faced to each other in the radial direction of the peripheral wall 32*a*, and projected from the internal circumference of the peripheral wall 32*a*. Further, the guides 87*a* and 87*b* are extended along the axial direction of the peripheral wall 32*a*.

An engaging groove 88 is formed in the guides 87*a* and 87*b*. The first and second edges 81*a* and 81*b* are fit slidable in the engaging grooves 88. The engaging grooves 88 are extended linearly along the axial direction of the peripheral wall 32*a*. One ends of the engaging grooves 88 are closed by the closed wall 32*b* of the insulating member 6. The other ends of the engaging grooves 88 are opened to the other end of the peripheral wall 32*a*.

When installing the lighting circuit 5 in the receptacle 12, insert the wiring board 28 into the inside of the peripheral wall 32*a* of the insulating member 6 by setting the third edge 81*c* of the wiring board 28 to the front. Insertion of the wiring board 28 is performed, while inserting the first and second edges 81*a* and 81*b* of the wiring board 28 into the engaging grooves 88. When inserting the wiring board 28 into the inside of the peripheral wall 32*a*, the third edge 81*c* of the wiring board 28 butts against the closed wall 32*b* of the insulating member 6. This determines the insertion depth of the wiring board 28 into the insulating member 6 without taking special care. This improves the workability when installing the lighting circuit 5 in the receptacle 12.

After inserting the wiring board 28 into the inside of the peripheral wall 32*a* of the insulating member 6, connect the connecting member 36 of the base 7 to the open end 12 of the outer shell 2. By this connection, the stoppers 85*a* and 85*b* of the connecting member 36 contact the first and second engaging parts 82*a* and 82*b* of the wiring board 28. Therefore, the wiring board 28 is held between the end wall 11 of the outer shell 2 and the stoppers 85*a* and 85*b*, holding the lighting circuit 5 not to move in the axial direction of the peripheral wall 8. As the first and second edges 81*a* and 81*b* of the wiring board 28 are fit in the engaging grooves 88 of the insulating member 6, the lighting circuit 5 is held not to move in the circumferential direction of the peripheral wall 8. Further, by intensifying the fitting of the first edge 81*a* of the wiring board 28 in the engaging groove 88, the lighting circuit 5 can be held not to move in the peripheral direction of the peripheral wall 8 only by fitting the first edge 81a in the engaging groove 88.

Therefore, the lighting circuit 5 is held unmovable in the receptacle 12 of the outer shell 2.

As shown in FIG. 13, the wiring board 28 of the lighting circuit 5 partitions the inside of the peripheral wall 32a of the insulating member 6 into two areas 89a and 89b along the radial direction. The areas 89a and 89b are opened to a space 90 inside the base 7, and connected with each other through the space 90.

The first and second surfaces 28a and 28b of the wiring board 28 are not directed to the light source support 11 which receives the heat of the light-emitting diodes 18, and faced to the peripheral wall 32a of the insulating member 6. Therefore, the soldered parts of the lead terminals of the circuit components 29 to the wiring board 28 are separated away from the closed wall 32b of the insulating member 6 contacting the light source support 11, preventing the influence of heat to the soldered parts.

Further, the condenser 83 adjacent to the fourth edge 81d of the wiring board 28 is placed in the space 90 inside the base 7, and separated away from the light source support 11 which receives the heat of the light-emitting diodes 18. Therefore, the condenser 83 is difficult to be influenced by the heat of the light-emitting diodes 18, and increased in the durability.

In addition, as a part of the lighting circuit 5 is placed in the space 90 inside the base 7, the lengths of the insulating member 6 and the outer shell 2 in the axial direction can be reduced. This is advantageous to make the lamp 1 compact. However, when the length of the outer shell 2 in the axial direction is reduced, the area of the heat radiating surface 10 is decreased. To solve this problem, increase the outside diameter of the outer shell 2 to compensate for the decrease of the area of the heat radiating surface 10.

Figure 16:
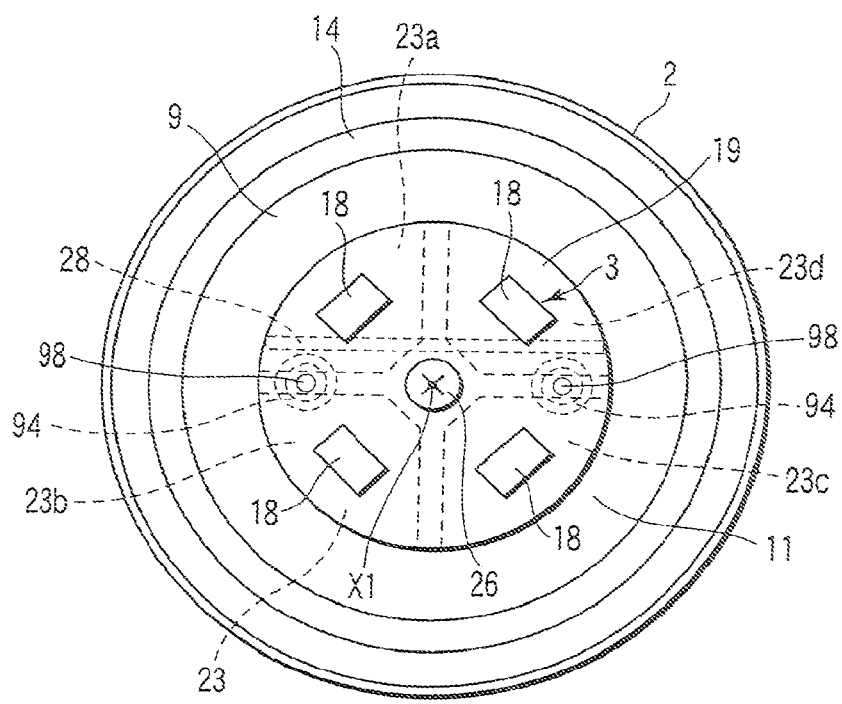
FIG. 16 is a front view showing a positional relationship between a wiring board to support a light-emitting diode and a light source support in a sixth embodiment of the present invention.

As shown in FIG. 13 and FIG. 16, the circuit components 29 mounted on the first surface 28a of the wiring board 28 are higher than the chip components 84 mounted on the second surface 28b. Therefore, the wiring board 28 of this embodiment is offset to the center line X1 of the lamp 1, so that the area 89a between the first surface 28a and the peripheral wall 32a of the insulating member 6 becomes larger than the area 89b between the second surface 28b and the peripheral wall 32a of the insulating member 6.

As a result, the high circuit components 29 can be separated as far as possible from the peripheral wall 8 of the outer shell 2, and the circuit components 29 are difficult to be influenced by the heat of the light-emitting diodes 18 transmitted to the peripheral wall 8. At the same time, a certain capacity can be ensured in the area 89b between the second surface 28b and the peripheral wall 8 of the outer shell 2. Therefore, even if the lead terminals of the circuit components 29 are projected to the area 89b from the second surface 28b of the wiring bard 28, the lead terminals are difficult to be influenced by the heat of the light-emitting diodes 18 transmitted to the peripheral wall 8. This prevents overheat of the part where the lead terminals are soldered to the wiring board 28.

According to the lamp 1 of the sixth embodiment, the wiring board 28 of the lighting circuit 5 is contained in the receptacle 12 of the outer shell 2 in the state that the first and second surfaces 28a and 28b are faced to the internal circumference of the peripheral wall 32a of the insulating member 6. Therefore, the first or second surface 28a or 28b of the wiring board 28 is not faced to the closed wall 32b of the insulating member 6.

Therefore, a substantially enclosed space is not formed between the wiring board 28 and closed wall 32b, and the heat generated by the lighting circuit 5 or the heat of the light-emitting diodes 18 transmitted to the light source support 11 is difficult to stay at the end portion of the receptacle 12 adjacent to the light source support 11. This prevents overheat of the light source support 11, and is advantageous to increase the cooling performance of the light-emitting diodes 18.

Further, the wiring board 28 extends over the outer shell 2 and the base 7, and the size of the wiring board 28 is not restricted by the inside diameter of the insulating member 6. This increases the flexibility of determining the size of the wiring board 28 and laying out the circuit parts 29 on the wiring board 28, and makes it easy to design the lighting circuit 5.

The sixth embodiment shows a structure to prevent a short circuit between the outer shell 2 and lead wires 30a and 30b.

Figure 15:
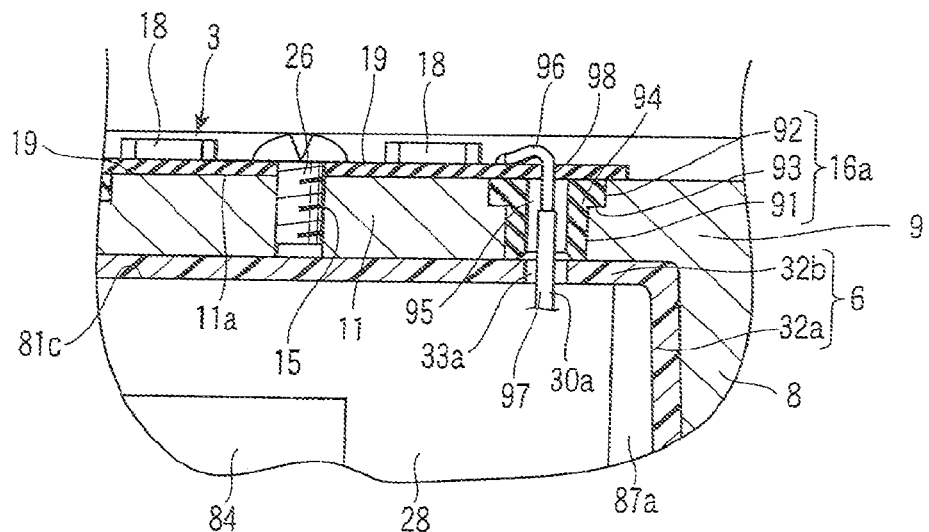
FIG. 15 is a sectional view showing a positional relationship between a lead wire and an insulating cylinder in a sixth embodiment of the present invention.

As shown in FIG. 14 and FIG. 15, a pair of through holes 16a and 16b formed in the light source support 11 has a small diameter part 91, a large diameter part 92 and a step 93. The step 93 is positioned in the boundary between the small diameter part 91 and large diameter part 92.

An insulating cylinder 94 is fit in the through holes 16a and 16b. The insulating cylinder 94 is made of synthetic resin material having electric insulation such as polybutylene terephthalate. The insulating cylinder 94 extends over the small diameter part 91 and large diameter part 92, covering the inside surfaces of the through holes 16a and 16b.

The insulating cylinder 94 has an insertion hole 95 to pass the lead wires 30a and 30b. The insertion hole 95 extends over the through holes 33a and 33b of the insulating member 6. As shown in FIG. 15, an open edge adjacent to the through holes 33a and 33b of the insertion hole 95 is expanded in the diameter by chamfering. This prevents the lead wires 30a and 30b from being caught by the open edge of the insertion hole 95 when the lead wires 30a and 30b are guided from the through holes 33a and 33b to the insertion hole 95.

The insulating cylinder 94 is fit in the through holes 16a and 16b from the supporting surface 11a of the light source support 11. By fixing the wiring board 28 onto the supporting surface 11a, the insulating cylinder 94 is held between the wiring board 28 and the step 93 of the through holes 16a and 16b, and the insulating cylinder 94 is held by the light source support 11. Therefore, it is unnecessary to bond the insulating cylinder 94 to the light source support 11. This makes it easy to assemble the lamp 1.

The lead wires 30a and 30b have a core 96 using a copper wire, for example, and an insulating layer 97 to cover the core 96. The insulating layer 97 is removed at the ends of the lead wires 30a and 30b. Therefore, the core 96 is exposed to the outside of the insulating layer 97 at the ends of the lead wires 30a and 30b. The exposed core 96 is electrically connected to the wiring board 28 by means of soldering.

If the insulating layer 97 is unevenly removed, the length of the core 96 exposed to the insulating layer 97 fluctuates. For example, as shown in FIG. 15, when the lead wire 30a is guided from the through hole 33a to the through hole 16a, the exposed core 96 may be positioned inside the through hole 16a. The insulating cylinder 94 fit in the through hole 16a is interposed between the exposed core 96 and the through hole 16a, electrically insulating the core 96 and light source support 11.

Therefore, a short circuit between the exposed core 96 and light source support 11 can be prevented by the insulating cylinder 94.

The exposed core 96 is inserted from the insertion hole 95 into a pair of through holes 98 formed on the wiring board 19, and guided onto the wiring board 19 through the through holes 98. The end of the exposed core 96 is soldered to a land (not shown) formed on the wiring board 19.

The wiring board 28 of the lighting circuit 5 is offset to the center line X1 of the lamp 1 as already described. Therefore, as shown in FIG. 16, each through hole 98 can be placed between the adjacent areas 23a and 23b, and 23c and 23d of the thermal diffusion layer 23. This does not decrease the area of the thermal diffusion layer 23, though the through hole 98 penetrates the wiring board 19. Therefore, the heat of the light-emitting diodes 18 can be efficiently transmitted to the light source support 11 through the thermal diffusion layer 23, and prevents overheat of the light-emitting diodes 18.

FIG. 21 to FIG. 25 shows a seventh embodiment of the invention.

A lamp 100 according to the seventh embodiment has an outer shell 101, a light source 102, a light source cover 103, a cover holder 104, a lighting circuit 105, an insulating member 106, a base 107, and a heat shielding cover 108.

The outer shell 101 is made of metal material with excellent heat conductivity, such as aluminum. As shown in FIG. 24, the outer shell 101 has a peripheral wall 110 and an end wall 111. The peripheral wall 110 and the end wall 111 are formed integrally. The peripheral wall 110 is shaped like a straight cylinder. The outer circumference of the peripheral wall 110 is a heat radiating surface 112.

The end wall 111 closes one end of the peripheral wall 110. The end wall 111 forms a circular plate light source support 113. The light source support 113 has a flat supporting surface 114 on the opposite side of the peripheral wall 110.

A receptacle 116 is formed inside the outer shell 101. The receptacle 116 is defined by a space surrounded by the peripheral wall 110 and end wall 111, and positioned inside the heat radiating surface 112. A stopper 117 is formed at a corner defined by the peripheral wall 110 and the end wall 111. The stopper 117 is formed circular, projecting to the inside surface of the peripheral wall 110 and continuing in the circumferential direction of the peripheral wall 110. The receptacle 116 has an open end 116a facing to the end wall 111. The open end 116a is positioned at the other end of the peripheral wall 110. An engaging groove 118 is formed in the internal circumference of the peripheral wall 110. The engaging groove 118 is positioned at the open end 116a of the receptacle 116, and formed circular continuing in the circumferential direction of the peripheral wall 110.

A recession 119 is formed in the outer circumference of the end wall 111. The recession 119 is circular surrounding the light source support 113. A male screw 121 is formed in the internal circumference of the recession 119. Instead of the male screw 121, a female screw may be formed on the outer circumference of the recession 119.

As shown in FIG. 24, a pair of through holes 122a and 122b and a pair of projections 123a and 123b are formed on the supporting surface 114 of the light source support 113. The through holes 122a and 122b are arranged with an interval in the radial direction of the light source support 113. The projections 123a and 123b are cylindrical, and project vertically from the supporting surface 114. The projections 123a and 123b are arranged with an interval in the radial direction of the light source support 113. The arrangement direction of the through holes 122a and 122b is orthogonal to the arrangement direction of the projections 123a and 123b.

As shown in FIG. 21 and FIG. 24, the light source 102 has a base 125, a wiring board 126, and a chip-shaped light-emitting element 127. The base 125 is made of metal material with excellent heat conductivity, such as an aluminum alloy. The wiring board 126 is stacked on the base 125. The light-emitting element 127 is a light-emitting diode, for example, and mounted at the center of the wiring board 126.

The light-emitting element 127 is covered by a transparent semispherical protection glass 128. The wiring board 126 has lands 129. The lands 129 are arranged with an interval in the circumferential direction of the wiring board 126, just like surround the protection glass 128. The wiring board 126 is covered by a not-shown insulating layer except the protection glass 128 and lands 129.

As shown in FIG. 24, a pair of lead wire insertion parts 131a and 131b, a pair of first engaging parts 132a and 132b, and a pair of second engaging parts 133a and 133b are formed in the outer circumference of the base 125 and the wiring board 126. The lead wire insertion parts 131a and 131b, first engaging parts 132a and 132b, and second engaging parts 133a and 133b are U-shaped notches. The lead wire insertion parts 131a and 131b, the first engaging parts 132a and 132b, and the second engaging parts 133a and 133b are not limited to the notches. They may be circular holes, for example.

The lead wire insertion parts 131a and 131b, the first engaging parts 132a and 132b, and the second engaging parts 133a and 133b are alternately arranged with an interval in the circumferential direction of the base 125 and wiring board 126. In other words, the lead wire insertion parts 131a and 131b, the first engaging parts 132a and 132b, and the second engaging parts 133a and 133b are positioned among the adjacent lands 129.

As shown in FIG. 21 and FIG. 22, the base 125 of the light source 102 is stacked on the supporting surface 114 of the light source support 113. A heat conduction sheet 135 having elasticity is interposed between the supporting surface 114 of the light source support 113 and the base 125. The heat conduction sheet 135 is made of resin composed mainly of silicon, for example, and formed circular one size larger than the light source 102. The heat conduction sheet 135 thermally connects the base 125 of the light source 102 and the light source support 113.

The heat conduction sheet 135 has escapes 136a, 136b, 136c, 136d, 136e and 136f on the periphery with an interval. The escapes 136a, 136b, 136c, 136d, 136e and 136f are U-shaped notches, for example. The escape 136a and 136b correspond to the lead wire insertion parts 131a and 131b. The escapes 136c and 136d correspond to the first engaging parts 132a and 132b. The escapes 136e and 136f correspond to the second engaging parts 133a and 133b.

In the state that the heat conduction sheet 135 is held between the light source support 113 and base 125, the projections 123a and 123b projecting from the supporting surface 114 are tightly fit in the first engaging parts 132a and 132b through the escapes 136c and 136d of the heat conduction sheet 135. This fitting prevents movement of the light source 102 in the circumferential and radial directions of the light source support 113. As a result, the light-emitting element 127 is positioned on the center line of the outer shell 101, and the lead wire insertion parts 131a and 131b are aligned with the escapes 136a and 136b.

As shown in FIG. 21 and FIG. 22, the light source cover 103 has a lens 138 and a lens holder 139. The lens 138 is used to control luminous intensity distribution of the lamp 101, and is formed as one boy made of transparent material, such as glass and synthetic resin.

The lens 138 has a light reflecting plane 140, a light radiating plane 141, a recession 142, and a flange 143. The light reflecting plane 140 is spherical, for example. The light radiating plane 141 is flat and faced to the light reflecting plane 140. The recession 142 is caved in from the center of the light reflecting plane 140 to the light radiating plane 141 to permit fitting-in of the protection glass 128. The recession 142 has a light entrance plane 144 surrounding the protection glass 128. The flange 143 projects from the outer circumference of the lens 138 to the outside of the radial direction of the lens 138. The flange 143 adjoins the light radiating plane 141, and continues in the circumferential direction of the lens 138.

Figure 25:
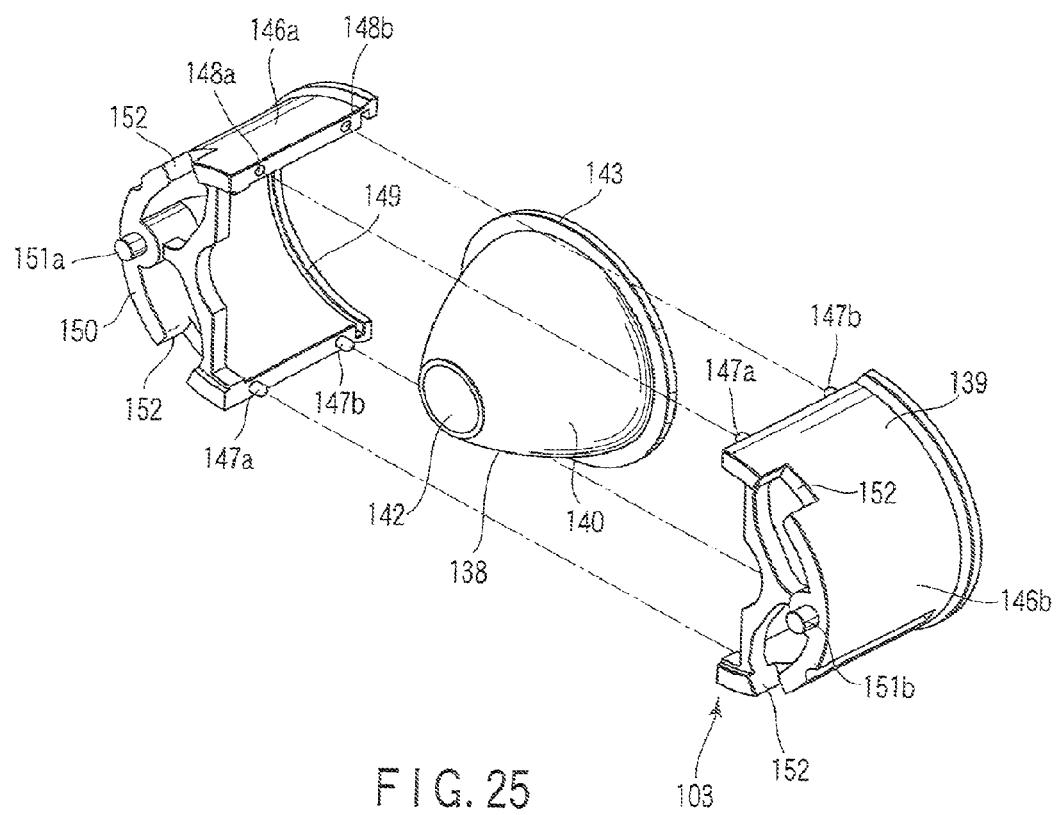
FIG. 25 is a perspective view of a separated light source cover of the seventh embodiment of the present invention.

The lens holder 139 is a part separated from the lens 138, and cylindrical surrounding the lens 138. As shown in FIG. 25, the lens holder 139 has a pair of holder elements 146a and 146b. The holder elements 146a and 146b are made of non-translucent synthetic resin material having electrical insulation, and formed semi-cylindrical.

The holder elements 146a and 146b have a pair of projections 147a and 147b and a pair of recessions 148a and 148b. The projections 147a and 147b of one holder element 146a fit in the recessions 148a and 148b of the other holder element 146b. The projections 147a and 147b of the other holder element 146b fit in the recessions 148a and 148b of one holder element 146a. By this fitting, the holder elements 146a and 146b are butted against each other; and assembled as the cylindrical lens holder 139.

An engaging groove 149 is formed in the internal circumference of the lens holder 139. The engaging groove 149 is positioned at one end along the axial direction of the lens holder 139, and continued in the circumferential direction of the lens holder 139. Projections 151a and 151b paired with a receiving part 150 are formed at the other end along the axial direction of the lens holder 139.

The receiving part 150 faces to the outer circumference of the wiring board 126 of the light source 102, and has notches 152. The notches 152 are arranged with an interval in the circumferential direction of the lens holder 139, so as to correspond to the lands 129 of the light source 102. The projections 151a and 151b correspond to the second engaging parts 133a and 133b of the light source 102, and project from the other end of the lens holder 139 to the light source 102.

As shown in FIG. 25, the holder elements 146a and 146b are butted against each other with the lens 138 interposed therebetween. By this arrangement, the flange 143 of the lens 138 is fit in the engaging groove 149, and held between the holder elements 146a and 146b. As a result, the lens 138 is held inside the lens holder 139, and the light radiating plane 141 of the lens 138 closes one end of the lens holder 139.

As shown in FIG. 21 and FIG. 22, the light source 102 is held between the light source cover 103 and the light source support 113 of the outer shell 101. Specifically, the receiving part 150 of the lens holder 139 contacts the wiring board 126 of the light source 102, just like avoiding the lands 129. Further, the projections 151a and 151b projecting from the lens holder 139 fit tightly in the second engaging parts 133a and 133b of the light source 102. This fitting prevents movement of the light source cover 103 in the circumferential and radial directions of the light source 102. Therefore, the protection glass 128 covering the light-emitting element 127 fits in the recession 142 of the lens 138, and the lead wire insertion parts 131a and 131b or the first engaging parts 132a and 132b engage with the notches 152 of the receiving part 150.

Therefore, the position of the light source cover 103 is determined to the light source 102, so that the optical axis X2 of the lens 138 shown in FIG. 21 is aligned with the light-emitting element 127.

As shown in FIG. 21, the cover holder 104 is formed as a cylinder or a square cylinder made of metal material with excellent heat conductivity, such as an aluminum alloy. The cover holder 104 has the same outside diameter of the outer shell 101, and the inside diameter and length capable of covering the light source 102 and light source cover 103 continuously.

A pressing part 155 is formed at one end of the cover holder 104. The pressing part 155 is a flange projecting from the internal circumference to the inside of the radial direction of the cover holder 104. A circular connecting part 156 is formed coaxially at the other end of the cover holder 104. The connecting part 156 projects from the other end of the cover holder 104 to the recession 119 of the outer shell 101. The connecting part 156 has a diameter smaller than the cover holder 104. A step 157 is formed in the boundary between the connecting part 156 and the other end of the cover holder 104. The step 157 has a flat surface continued to the circumferential direction of the cover holder 104.

A female screw 158 is formed in the internal circumference of the connecting part 156. The female screw 158 can be fit over the male screw 121 of the recession 119. If a female screw is formed in the outer circumference of the recession 119 instead of the male screw 121, a male screw may be formed in the outer circumference of the connecting part 156.

The cover holder 104 is connected coaxially with the outer shell 101 by fitting the female screw 158 over the male screw 121 of the recession 119. As the cover holder 104 is connected, the pressing part 155 of the cover holder 104 butts against one end of the lens holder 139. The lens holder 139 is pressed to the light source support 113 of the outer shell 102. Therefore, the light source cover 103 is held between the pressing part 155 of the cover holder 104 and the light source 102.

As shown in FIG. 21 and FIG. 22, when the cover holder 104 is connected to the outer shell 102, the outer circumference of the end wall 111 of the outer shell 102 butts against the step 157 of the cover holder 104. This increases the contacting area of the outer shell 102 and the cover holder 104, and increases a heat conduction path from the outer shell 102 to the cover holder 104.

The lighting circuit 105 is used to light the light-emitting element 127, and contained in the receptacle 116 of the outer shell 102. As the lighting circuit 105 is installed inside the outer shell 101, it is unnecessary to arrange the outer shell 101 and lighting circuit 105 in the axial direction of the lamp 100. Therefore, the length of the lamp 100 in the axial direction can be reduced, and the compact lamp 100 can be provided.

As shown in FIG. 21, the lighting circuit 105 has a wiring board 160 and circuit components 161. The lighting circuit 105 is electrically connected to the light source 102 through two lead wires 162a and 162b shown in FIG. 24. The lead wires 162a and 162b are guided onto the wiring board 126 of the light source 102 through the lead wire insertion parts 131a and 131b of the light source 102 from the through holes 122a and 122b of the light source support 113. The ends of the lead wires 162a and 162b are soldered to the two lands 129.

The insulating member 106 is an example of an insulating layer for electrically insulating the outer shell 101 and the lighting circuit 105. The insulating member 106 is a molding using synthetic resin material such as polybutylene terephthalate. As shown in FIG. 21, the insulating member 106 is cup-shaped having a cylindrical peripheral wall 163a and a closed wall 163b closing one end of the peripheral wall 163a.

The insulating member 106 is fit in the receptacle 116 through the open end 116a. Therefore, the peripheral wall 163a of the insulating member 116 butts contacts the internal circumference of the peripheral wall 110 of the outer shell 101, and the closed wall 163b of the insulating member 116 butts against the stopper 117. The stopper 117 is interposed between the light source support 113 and the closed wall 163b of the insulating member 116. Therefore, the light source support 113 and closed wall 163b are separated, and a gap 165 is provided between them.

The existence of the gap 165 keeps the light source support 113 thermally connected to the light source 102 non-contacting with the insulating member 106. The gap 165 functions as a heat shielding space to prevent conduction of heat from the light source support 113 to the insulating member 106, and the heat of the light source 102 is difficult to transmit directly from the light source support 113 to the insulating member 106.

Therefore, though the lighting circuit 105 is contained in the outer shell 101 which receives the heat of the light source 102, the lighting circuit 105 can be protected against the heat of the light source 102. This prevents a malfunction of the lighting circuit 105, and makes the life of the lighting circuit 105 long.

The closed wall 163b of the insulating member 106 has a not-shown pair of through holes. The through holes are formed to pass the lead wires 162a and 162b, and opened to the receptacle 116 and the gap 165, penetrating the closed wall 163b.

The base 107 is used to supply an electric current to the lighting circuit 105. The base 107 has a metal base shell 167 and a connecting member 168 fixed to the base shell 167. The base shell 167 is removably connected to a lamp socket of a light fixture. The lamp 100 of the seventh embodiment is configured to be fit to a lamp socket with the base 107 faced up as shown in FIG. 21.

The connecting member 168 is a molding using synthetic resin material such as polybutylene terephthalate. The connecting member 168 has electrical insulation, and heat conductivity lower than the outer shell 101.

The connecting member 168 has a distal end 169 fit inside the open end 116a of the receptacle 116. An engaging projection 170 is formed in the outer circumference of the distal end 169. The engaging projection 170 engages with the engaging groove 118 when the distal end 169 is fit inside the open end 116a. By this engagement, the outer shell 101 and the base 107 are coaxially connected. The connecting member 168 is interposed between the base shell 167 and the outer shell 101, and insulates them electrically and thermally.

As shown in FIG. 21, the connecting member 168 has an outer circumference 171 larger than the diameter of the distal end 169. The outer circumference 171 projects coaxially to the outside of the radial direction of the outer shell 101. A circular supporting wall 172 is formed in the outer circumference 171 of the connecting member 168. The supporting wall 172 coaxially surrounds the distal end 169 of the connecting member 168. A male screw 173 is formed on the outer peripheral surface of the supporting wall 172.

The heat shielding cover 108 is a molding using synthetic resin material, and formed like a hollow cylinder. The heat shielding cover 108 has heat conductivity lower than the outer shell 101. As shown in FIG. 21, the heat shielding cover 108 has the inside diameter and length capable of coaxially surrounding the outer shell 101 and cover holder 104.

A female screw 174 is formed in the internal circumference of one end of the heat shielding cover 108. An engaging part 175 is formed at the other end of the heat shielding cover 108. The engaging part 175 is a flange projecting from the internal circumference of the other end of the heat shielding cover 108 to the inside of the radial direction. The inside diameter of the engaging part 175 is smaller than the outside diameter of the cover holder 104.

The female screw 174 of the heat shielding cover 108 is fit over the male screw 173 of the connecting member 168. By this fitting, the engaging part 175 of the heat shielding cover 108 is caught by one end of the cover holder 104. Therefore, the cover 108 is connected to the connecting member 168 of the base 107, surrounding the outer shell 101 and cover holder 104 coaxially.

A heat radiating path 176 is formed between the heat shielding cover 108 and the outer shell 101, and between the heat shielding cover 108 and the cover holder 140. The heat radiating path 176 surrounds the outer shell 101 and cover holder 104, and continues in the radial direction of the lamp 100.

One end of the heat radiating path 176 is closed by the outer circumference 171 of the connecting member 168. Exhaust ports 177 are formed in the outer circumference 171 of the connecting member 168. The exhaust ports 177 are arranged with an interval in the circumferential direction of the connecting member 168, and connected to one end of the heat radiating path 176. The other end of the heat radiating path 176 is closed by the engaging part 175 of the heat shielding cover 108. Suction ports 178 are formed in the engaging part 175 of the heat shielding cover 108. The suction ports 178 are arranged with an interval in the circumferential direction of the heat shielding cover 108, and connected to the other end of the heat radiating path 176.

In the seventh embodiment, the suction ports 178 are formed in the engaging part 175 of the heat shielding cover 108. Instead of the suction ports 178, projections contacting one end of the cover holder 104 may be formed at the other end of the heat shielding cover 108, and gaps between adjacent projections may be used as suction ports. Similarly, through holes opened to the heat radiating path 176 may be formed at the other end of the heat shielding cover 108, and used as suction ports.

Further, instead of forming the exhaust ports 177 in the base 107, through holes opened to the heat radiating path 176 may be formed at one end of the heat shielding cover 108, and used as exhaust ports.

Next, explanation will be given on a procedure of assembling the lamp 100.

First, fit the insulating member 106 in the receptacle 116 of the outer shell 101, and install the lighting circuit 105 in the receptacle 116 covered by the insulating member 106. Next, guide the two lead wires 162a and 162b extending from the light circuit 105, to the through holes 122a and 122b of the light source support 113 through the through holes of the closed wall 163b.

Then, place the heat conduction sheet 135 on the supporting surface 114 of the light source support 113, and stack the base 125 of the light source 102 on the heat conduction sheet 135. In this time, fit the projections 123a and 123b of the light source support 113 in the first engaging parts 132a and 132b of the light source 102 through the escapes 136c and 136d of the heat conduction sheet 135. This fitting determines the relative positions of the light source 102 and the light source support 113. Guide the lead wires 162a and 162b from the through holes 122a and 122b to the adjacent two lands 129 through the lead wire insertion parts 131a and 131b of the light source 102, and solder the lead wires 162a and 162b to the lands 129.

Next, place the light source cover 103 on the wiring board 126 of the light source 102. In this time, fit the projections 151a and 151b projected from the lens holder 139, in the second engaging parts 133a and 133b of the light source 102. This fitting determines the relative positions of the light source 102 and the light source support 103. Therefore, the optical axis X2 of the lens 138 coincides with the center of the light-emitting element 127, and the receiving part 150 of the lens holder 139 butts against the outer circumference of the wiring board 126.

Next, insert the female screw 158 of the cover holder 104 onto the male screw 121 of the outer shell 102, and connect the cover holder 104 coaxially with the outer shell 101. As the cover holder 104 is connected, the pressing part 155 of the cover holder 104 butts against one end of the lens holder 139, and presses the lens holder 139 toward the light source support 113. As a result, the light source 102 is pressed to the supporting surface 114 of the light source support 113 through the lens holder 139, and the heat conduction sheet 135 is tightly held between the supporting surface 114 and the base 125 of the light source 102.

The heat conduction sheet 135 is elastically deformed and tightly stuck to the supporting surface 114 and the base 125. This eliminates a gap between the supporting surface 114 and the base 125 disturbing the conduction of heat, and provides good conduction of heat between the supporting surface 114 and the base 125. In other words, comparing the case that the heat conduction sheet 135 is not used, the heat conduction performance from the light source 102 to the light source support 113 is improved.

At the same time, the engagement of the male and female screws 121 and 158 is made tight by a repulsive force of the heat conduction sheet 135 to elastically return to the original form. Therefore, the cover holder 104 is difficult to become loose.

For example, when the accuracy of the supporting surface 114 and base 125 is high, the heat conduction sheet 135 can be omitted. Instead of the heat conduction sheet 135, conductive grease composed mainly of silicon may be used.

When the light source 102 is pressed to the light source support 113, a revolving force generated by insertion of the cover holder 104 acts on the light source cover 103 and light source 102. As already explained, the relative position of the light source 102 to the light source support 113 is determined by the fitting of the projections 123a and 123b with the first engaging parts 132a and 132b. Similarly, the relative position of the light source cover 103 to the light source 102 is determined by the fitting of the projections 151a and 151b with the second engaging parts 133a and 133b.

Therefore, the light source cover 103 and the light source 102 do not rotate following the cover holder 104. An unreasonable force causing a break and a crack is not applied to the soldered part between the lands 129 of the light source 102 and the lead wires 162a and 162b. The lamp 100 can be assembled without giving a stress to the soldered part between the lead wires 162a and 162b and the lands 129.

Next, fit the base 107 to the outer shell 101. This work is performed by fitting the distal end 169 of the base 107 in the open end 116 of the outer shell 101, and engaging the engaging projection 170 with the engaging groove 118.

When fitting the base 107 to the outer shell 101, the lighting circuit 105 may receive a force of pressing to the light source support 113, from the connecting part 168 of the base 107. This force is transmitted to the light source 102 through the lead wires 162a and 162b.

The light source 102 is held between the light source cover 103 and the light source support 113. Even if a force is applied to the light source 102 through the lead wires 162a and 162b, the light source 102 will not be separated from the supporting surface 114 of the light source support 113. Therefore, the tight contact between the light source 102 and the light source support 113 is maintained, and the optical axis X2 of the lens 138 will not be deviated from the center of the light-emitting element 127.

Finally, fit the heat shielding cover 108 to the outside of the outer shell 101 and the cover holder 104, and insert the female screw 174 of the heat shielding cover 108 onto the male screw 173 of the connecting member 168. By the insertion, the engaging part 175 of the heat shielding cover 108 is caught by one end of the cover holder 104. As a result, the heat shielding cover 108 is connected to the base 107, surrounding coaxially the outer shell 101 and the cover holder 104, and the assembling of the lamp 100 is completed.

In the state that the assembling of the lamp 100 is completed, the heat radiating path 176 positioned inside the heat shielding cover 108 is opened to the atmosphere through the suction ports 178 and exhaust ports 177.

In the lamp 100 of the seventh embodiment, when the lamp 100 is lit, the light-emitting element 127 is heated. The heat of the light-emitting element 127 is transmitted from the base 125 of the light source 102 to the light source support 113 through the heat conduction sheet 135. The heat transmitted to the light source support 113 is transmitted to the heat radiating surface 112 from the end wall 110 through the peripheral wall 110, and radiated from the heat radiating surface 112 to the heat radiating path 176.

The light source support 113 receiving the heat of the light-emitting element 127 is formed integrally with the peripheral wall 110 having the heat radiating surface 112, and there is no joint disturbing the conduction of heat in a heat conduction path from the light source support 113 to the radiating surface 112. Therefore, the thermal resistance of the heat conduction path can be controlled to small, and the heat of the light-emitting element 127 transmitted to the light source support 113 can be efficiently escaped to the heat radiating surface 112. At the same time, as the whole surface of the heat radiating surface 112 is exposed to the heat radiating path 176, the heat radiation from the heat radiating surface 112 is not disturbed. This improves the cooling performance of the light-emitting element 27.

Further, as the metal cover holder 104 is screwed into the outer shell 101, the engagement of the female screw 174 and the male screw 173 thermally connects the outer shell 101 and the cover holder 104. Therefore, the heat of the outer shell 101 is transmitted also to the cover holder 104, and radiated from the outer peripheral surface of the cover holder 104 to the heat radiating path 176. Therefore, the heat radiating area of the lamp 100 can be increased by using the cover holder 104, and the cooling performance of the light-emitting element 127 is improved furthermore.

When the heat of the light-emitting element 127 is radiated to the heat radiating path 176, an ascending current is generated in the heat radiating path 176. Therefore, the air outside the lamp 100 is taken in the heat radiating path 176 through the suction ports 178 positioned at the lower end of the lamp 100. The air taken in the heat radiating path 176 flows from the lower to upper side in the heat radiating path 176, and is radiated to the atmosphere through the exhaust ports 177.

The outer circumference of the cover holder 104 and the heat radiating surface 112 of the outer shell 101 are exposed to the heat radiating path 176. The heat of the light-emitting element 127 transmitted to the cover holder 104 and the outer shell 101 is taken away by the heat exchange with the air flowing in the heat radiating path 176. Therefore, the cover holder 104 and the outer shell 101 can be cooled by the air, and overheat of the light-emitting element 127 can be prevented. This prevents decrease of the light-emitting efficiency of the light emitting element 127, and makes the life of the light-emitting element 127 long.

The heat shielding cover 108 to cover the cover holder 104 and the outer shell 101 is made of synthetic resin material with a low heat conductivity. Therefore, the heat of the cover holder 104 and the outer shell 101 is difficult to transmit to the heat shielding cover 108, and the temperature of the heat shielding cover 108 is decreased to lower than the outer shell 101.

According to the seventh embodiment, the connecting member 168 to fit with the heat shielding cover 108 is made of synthetic resin, and the connecting member 168 thermally insulates the outer shell 101 and the heat shielding cover 108. Further, the engaging part 175 of the heat shielding cover 108 to contact the cover holder 104 has the suction ports 178. Even if the heat of the cover holder 104 is transmitted to the engaging part 175 of the heat insulating cover 108, the engaging part 175 is cooled by the air flowing into the heat radiating path 176 through the suction ports 178. Therefore, the heat shielding cover 108 is difficult to be influenced by the heat of the cover holder 104, and the temperature increase of the heat shielding cover 108 can be prevented.

According to the lamp 100 of the seventh embodiment, even if the operator holds the heat insulating cover 108 by hand when replacing the lamp 100 during lighting or immediately after turning off the lamp, the operator does not feel hot. Therefore, the operator does not drop the lamp 100 when touching the lamp and surprised by the heat, and can safely replace the lamp 100.

In the seventh embodiment, fine holes may be formed in the heat insulating cover 108. Instead of holes, slits may be formed along the axial or circumferential direction of the heat shielding cover 108.

FIG. 26 and FIG. 27 show an eighth embodiment of the invention.

The eighth embodiment is different from the seventh embodiment in the configuration for radiating the heat of the outer shell 101 and the cover holder 104. The other components of the lamp 100 and technical effects are the same as those of the seventh embodiment. Therefore, the same components as those of the seventh embodiment are given same reference numerals, and explanation of these components will be omitted.

The lamp 100 according to the eighth embodiment has the following configuration instead of the heat shielding cover 108 in the seventh embodiment. As shown in FIG. 26 and FIG. 27, the outer shell 101 has first heat radiating fins 200. The first heat radiating fins 200 project radially from the heat radiating surface 112 of the outer shell 101. The first heat radiating fins 200 are extended in the axial direction of the outer shell 101, and arranged with an interval in the circumferential direction of the outer shell 101.

The cover holder 104 has second heat radiating fins 201. The second heat radiating fins 201 project radially from the outer circumference of the cover holder 104. The second heat radiating fins 201 are extend in the axial direction of the cover holder 104, and arranged with an interval in the circumferential direction of the cover holder 104.

The first and second heat radiating fins 200 and 201 continue each other along the axial direction of the lamp 100. Therefore, the first and second heat radiating fans 200 and 201 are thermally connected, and directly exposed to the outside of the lamp 100.

The distal edges of the first heat radiating fins 200 are covered by first edge covers 202. Similarly, the distal edges of the second heat radiating fins 201 are covered by second edge covers 203. The first and second edge covers 202 and 203 are mode of synthetic resin. The first and second edge covers 202 and 203 have heat conductivity lower than the outer shell 101 and the cover holder 104.

According to the lamp 100 of the eighth embodiment, the existence of the first heat radiating fins 200 increase the heat radiating area of the heat radiating surface 112 of the outer shell 101. Likewise, the existence of the second heat radiating fins 201 increases the heat radiating area of the peripheral surface of the cover holder 104. Therefore, the heat of the light-emitting element 127 transmitted to the outer shell 101 and the cover holder 104 can be efficiently radiated to the outside of the lamp 100. This can prevent the decrease of the light-emitting efficiency of the light-emitting element 127, and make the life of the light-emitting element 127 long.

Further, the first and second edge covers 202 and 203 covering the distal edges of the first and second heat radiating fins 200 and 201 have heat conductivity lower than the outer shell 101 and the cover holder 104. Therefore, the heat of the outer shell 101 and the cover holder 104 is difficult to transmit to the first and second edge covers 202 and 203, and the temperatures of the first and second edge covers 202 and 203 can be decreased to lower than the outer shell 101 and the cover holder 104.

As a result, even if the operator holds the first and second heat radiating fins 200 and 201 by hand when replacing the lamp 100 during lighting or immediately after turning off the lamp, the operator does not feel hot. Therefore, the operator does not drop the lamp 100 when touching the lamp and surprised by the heat, and can safely replace the lamp 100.

Figure 29:
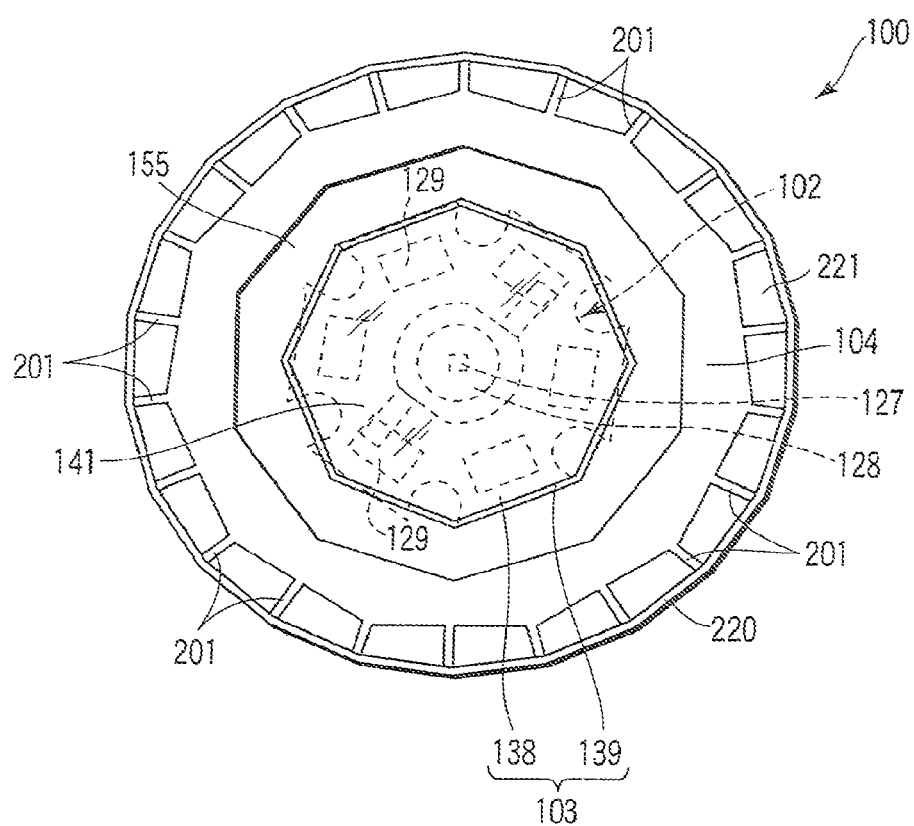
FIG. 29 is a plan view of the lamp according to the ninth embodiment of the present invention.

FIG. 28 and FIG. 29 show a ninth embodiment of the invention.

The ninth embodiment is developed from the eight embodiment. The configuration of the lamp 100 is the same as the eight embodiment. Therefore, the same components as those of the eighth embodiment are given same reference numerals, and explanation of these components will be omitted.

The lamp 100 of the ninth embodiment has an outside cylinder 220 surrounding the first and second heat radiating fins 200 and 201. The outside cylinder 220 is formed like a hollow cylinder with the diameter larger than the outer shell 101 and the cover holder 104. The outside cylinder 220 has the length extending over the peripheral wall 110 of the outer shell 101 and the cover holder 104. The inner peripheral surface of the outside cylinder 220 contacts the first and second edge covers 202 and 203. Therefore, the outside cylinder 220 extends over the adjacent first and second heat radiating fins 200 and 201.

In other words, the outside cylinder 220 faces to the heat radiating surface 112 through the first heat radiating fins 200, and faces to the peripheral surface of the cover holder 104 through the second heat radiating fins 201. Therefore, a heat radiating path 221 is formed between the heat radiating surface 112 of the outer shell 101 and the outside cylinder 220, and between the peripheral surface of the cover holder 104 and the outside cylinder 220. The heat radiating path 221 continues in the axial direction of the lamp 100. The first and second heat radiating fins 200 and 201 are exposed to the heat radiating path 221. The heat radiating path 221 has one end 221*a* and the other end 221*b*. The one end 221*a* of the heat radiating path 221 is opened to the atmosphere from the lower end of the second heat radiating fins 201, when the lamp 100 is lit with the base 107 faced up. Likewise, the other end 221*b* of the heat radiating path 221 is opened to the atmosphere from the upper end of the first heat radiating fins 200, when the lamp 100 is lit with the base 107 faced up.

The outside cylinder 220 is made of material with heat conductivity lower than the outer shell 101 and the cover holder 104. For example, when the outside cylinder 220 is made of heat shrinking synthetic resin, it is desirable to heat the outside cylinder 220 to shrink by the heat, after fitting the outside cylinder 222 to the outside of the outer shell 101 and the cover holder 104. The inner circumference of the outside cylinder 220 is pressed to the first and second edge covers 202 and 203, and the outside cylinder 220 is connected integrally with the outer shell 101 and the cover holder 104. This facilitates fitting of the outside cylinder 220.

In the lamp 100 of the ninth embodiment, when the heat of the light-emitting element 127 is radiated to the heat radiating path 221, an ascending current is generated in the heat radiating path 221. Therefore, the air outside the lamp 100 is taken in the heat radiating path 221 through one end 221a of the heat radiating path 221. The air taken in the heat radiating path 221 flows from the lower to upper side in the heat radiating path 221, and is radiated to the atmosphere through the other end 221b of the heat radiating path 221.

The heat of the light-emitting element 127 transmitted to the cover holder 104 and the outer shell 101 is taken away by the heat exchange with the air flowing in the heat radiating path 221. Therefore, the outer shell 101 having the first heat radiating fins 200 and the cover holder 104 having the second heat radiating fins 201 can be cooled by the air, and overheat of the light-emitting element 127 can be prevented. This prevents decrease of the light-emitting efficiency of the light emitting element 127, and makes the life of the light-emitting element 127 long.

The outside cylinder 220 is made of synthetic resin material with the heat conductivity lower than the outer shell 101 and the cover holder 104. Therefore, the heat of the cover holder 104 and the outer shell 101 is difficult to transmit to the outside cylinder 220, and the temperature of the outside cylinder 220 is decreased to lower than the outer shell 101 and the cover holder 104.

As a result, even if the operator holds the outside cylinder 220 by hand when replacing the lamp 100 during lighting or immediately after turning off the lamp, the operator does not feel hot. Therefore, the operator does not drop the lamp 100 when touching the lamp and surprised by the heat, and can safely replace the lamp 100.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source comprising:
   a single, continuous board having a first surface and a second surface which is an opposite side with respect to the first surface, the first and second surfaces being flat;
   a plurality of light-emitting diodes mounted on mounting positions of the first surface of the board such that the diodes overlap the board when viewed in a first direction perpendicular to the first and second surfaces of the board; and
   a thermal diffusion layer disposed on the second surface of the board and including portions corresponding to the mounting positions of the light-emitting diodes, the thermal diffusion layer having a thickness less than a thickness of the board in the first direction perpendicular to the first and second surfaces of the board,
   wherein the portions of the thermal diffusion layer overlap the second surface of the board when viewed in a second direction perpendicular to the first and second surfaces of the board, the second direction being opposite to the first direction,
   wherein elongated spaces are formed between the portions of the thermal diffusion layer and disposed on a second surface side of the board, each of the elongated spaces extending in directions so as to cross imaginary lines that connect adjacent ones of the portions to each other, and
   wherein the thermal diffusion layer is not formed in the elongated spaces.

2. The light source according to claim 1, further comprising:
   a pattern layer disposed on the first surface.

3. The light source according to claim 1, wherein:
   the board includes a screw hole, the screw hole comprising a through hole connecting the first surface and the second surface; and
   the second surface includes a portion where the thermal diffusion layer is not formed immediately around the through hole.

4. The light source according to claim 3, wherein the portion where the thermal diffusion layer is not formed connects to the elongated spaces.

5. The light source according to claim 1, wherein the elongated spaces extend through an entire thickness of the thermal diffusion layer in the first direction perpendicular to the first and second surfaces of the board.

6. The light source according to claim 1, wherein the elongated spaces extend from a first surface of the thermal diffusion layer facing the second surface of the board to a second surface of the thermal diffusion layer opposite to the first surface of the thermal diffusion layer.

7. A lamp comprising:
   a light source support; and
   a light source which is supported on the light source support, the light source comprising:
     a board having a first surface and a second surface which is an opposite side with respect to the first surface;
     a plurality of light-emitting diodes mounted on mounting positions of the first surface of the board such that the diodes overlap the board when viewed in a first direction perpendicular to the first and second surfaces of the board; and
     a thermal diffusion layer disposed on the second surface of the board and including portions corresponding to the mounting positions of the light-emitting diodes,
     wherein the portions of the thermal diffusion layer overlap the second surface of the board when viewed in a second direction perpendicular to the first and second surfaces of the board, the second direction being opposite to the first direction,
     wherein elongated spaces are formed between the portions of the thermal diffusion layer on the second surface of the board, each of the elongated spaces extending in directions so as to cross imaginary lines that connect adjacent ones of the portions to each other, and
     wherein the thermal diffusion layer is not formed in the elongated spaces.

* * * * *